United States Patent
Lahti et al.

(10) Patent No.: US 10,956,869 B2
(45) Date of Patent: Mar. 23, 2021

(54) ASSESSMENT SYSTEM

(71) Applicant: SHL Group Limited, Surrey (GB)

(72) Inventors: Kenneth Lahti, Surrey (GB); Tracy Kantrowitz, Surrey (GB); Paul Dekoekkoek, Surrey (GB); Jolene Meyer, Surrey (GB); Darrin Grelle, Surrey (GB); Jeff Facteau, Surrey (GB); Mathijs Affourtit, Surrey (GB); Richard McLellan, Surrey (GB); Steven Fleck, Surrey (GB); Craig Dawson, Surrey (GB)

(73) Assignee: SHL Group Limited, Surrey (GB)

( * ) Notice: Subject to any disclaimer, the term of this patent is extended or adjusted under 35 U.S.C. 154(b) by 212 days.

(21) Appl. No.: 15/029,969

(22) PCT Filed: Oct. 16, 2014

(86) PCT No.: PCT/IB2014/002382
§ 371 (c)(1),
(2) Date: Apr. 15, 2016

(87) PCT Pub. No.: WO2015/056091
PCT Pub. Date: Apr. 23, 2015

(65) Prior Publication Data
US 2016/0283905 A1    Sep. 29, 2016

Related U.S. Application Data

(60) Provisional application No. 61/891,812, filed on Oct. 16, 2013.

(51) Int. Cl.
*G06Q 10/10* (2012.01)
*G06Q 10/00* (2012.01)
(Continued)

(52) U.S. Cl.
CPC ..... *G06Q 10/1053* (2013.01); *G06F 16/9535* (2019.01); *G06Q 10/105* (2013.01)

(58) Field of Classification Search
CPC .............. G06Q 10/1053; G06Q 10/105; G06F 16/9535
(Continued)

(56) References Cited

U.S. PATENT DOCUMENTS 6,701,313 B1 *   3/2004   Smith ................... G06F 16/289
7,367,808 B1 *   5/2008   Frank ..................... G06Q 10/06
                                                                 434/219
(Continued)

FOREIGN PATENT DOCUMENTS

AU       2010201105        10/2011

OTHER PUBLICATIONS

"GettingHired, LLC Announces the Launch of GettingHired.com; Unique Job Board . . . Matching Job Seekers & Employers by Using Workplace Compatibility Assessments, Prior Job Experiences and Educational Backgrounds." Business Wire, Jun. 27, 2006 (Year: 2006).*

(Continued)

Primary Examiner — Jonathan P Ouellette
(74) Attorney, Agent, or Firm — Fish & Richardson P.C.

(57) ABSTRACT

An assessment system, including methods of and apparatus for producing a targeted assessment scheme comprising battery of tests or assessments and based on a plurality of requirements. Methods described include a method of producing an assessment scheme for assessing the suitability of a candidate, the method comprising: receiving as input from a user at least one candidate requirement and at least one candidate test identifier; constructing a candidate assessment comprising at least one test in dependence on the test identifier; analysing the candidate assessment in dependence (Continued)

on the requirement to predict the accuracy of the assessment in identifying a suitable candidate; and reporting on the predicted accuracy of the candidate assessment.

20 Claims, 32 Drawing Sheets

(51) Int. Cl.
*G06Q 10/06* (2012.01)
*G06Q 30/08* (2012.01)
*G06Q 30/02* (2012.01)
*G06F 16/9535* (2019.01)

(58) Field of Classification Search
USPC .................................................. 705/1.1–912
See application file for complete search history.

(56) References Cited

U.S. PATENT DOCUMENTS

| | | | |
|---|---|---|---|
| 8,082,168 B1 * | 12/2011 | Judy | G06Q 10/063112 705/7.14 |
| 8,326,771 B2 | 12/2012 | Roberts | |
| 2005/0197988 A1 * | 9/2005 | Bublitz | G06Q 10/105 706/46 |
| 2006/0271421 A1 * | 11/2006 | Steneker | G06Q 10/063112 705/7.14 |
| 2007/0015125 A1 | 1/2007 | Mobbs et al. | |
| 2008/0027771 A1 | 1/2008 | Steel | |
| 2011/0276356 A1 | 11/2011 | Smith et al. | |
| 2012/0173445 A1 | 7/2012 | Asaimuthu | |
| 2012/0215710 A1 * | 8/2012 | Scarborough | G06Q 10/063 705/321 |
| 2015/0134694 A1 | 5/2015 | Burke et al. | |

OTHER PUBLICATIONS

International Search Report for corresponding International Application No. PCT/IB2014/002382, dated Feb. 12, 2016, 4 pages.
International Preliminary Report on Patentability for corresponding International Application No. PCT/IB2014/002382, dated Apr. 19, 2016, 7 pages.
Written Opinion of the International Searching Authority for corresponding International Application No. PCT/IB2014/002382, dated Feb. 12, 2016, 6 pages.
Extended European Search Report for European Application No. 14854150.1, dated Apr. 25, 2017, 9 pages.
Eugene Burke, Answering the critical questions about the potential of your people and the effectiveness of your talent management processes, CEB's SHL Talent Analytics™, 2013, 17 pages.
Anna Brown, The Occupational Personality Questionnaire Revolution: Applying Item Response Theory to questionnaire design and scoring, SHL White Paper 2009, 8 pages.
People Performance, Join the Revolution, The Revolution in Personal Assessment, www.shl.com, 2009 SHL Group Limited, 10 pages.
Intellectual Property of India, Examination Report issued in related IN Application No. 201617016297 dated Jul. 15, 2020, 7 pages.
European Patent Office, Summons to attend oral proceedings pursuant to Rule 115(1) issued in related EP Application No. 14 854 150.1 dated May 28, 2020, 11 pages.

* cited by examiner

Figure 5a
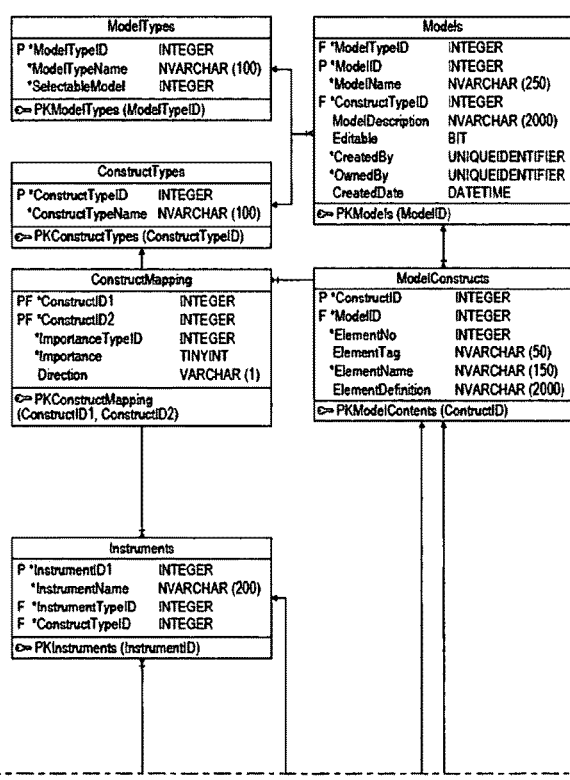
Figure 5b
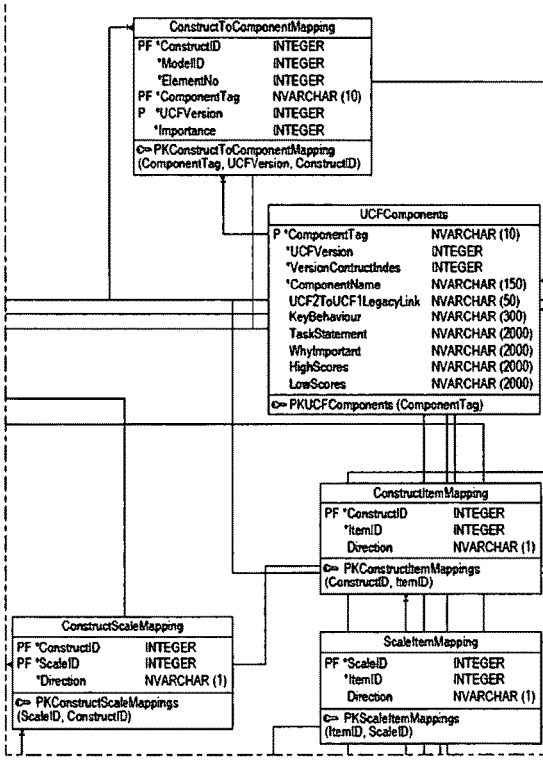
Figure 5d
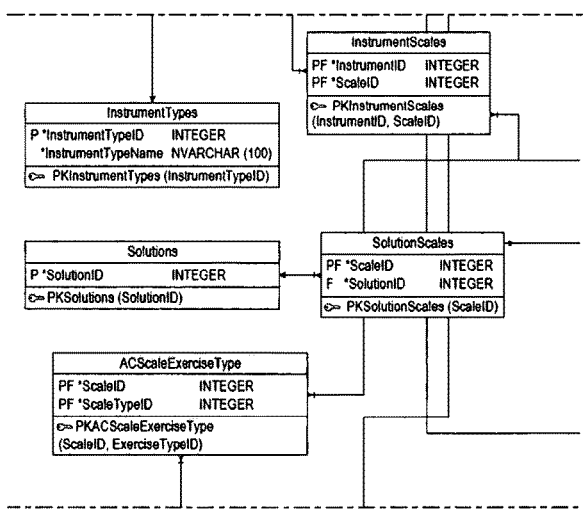
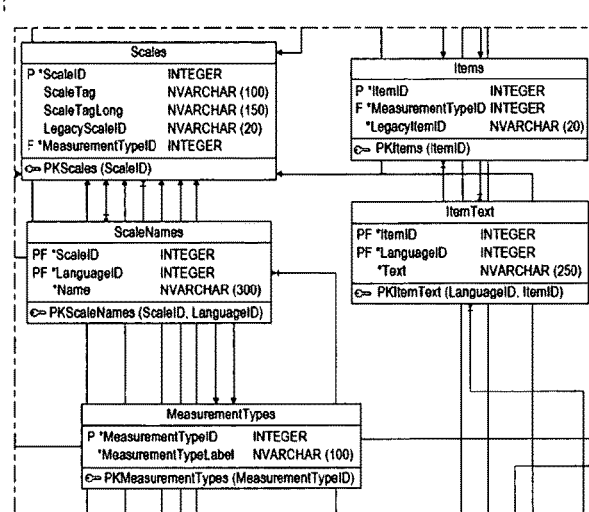
Figure 5e

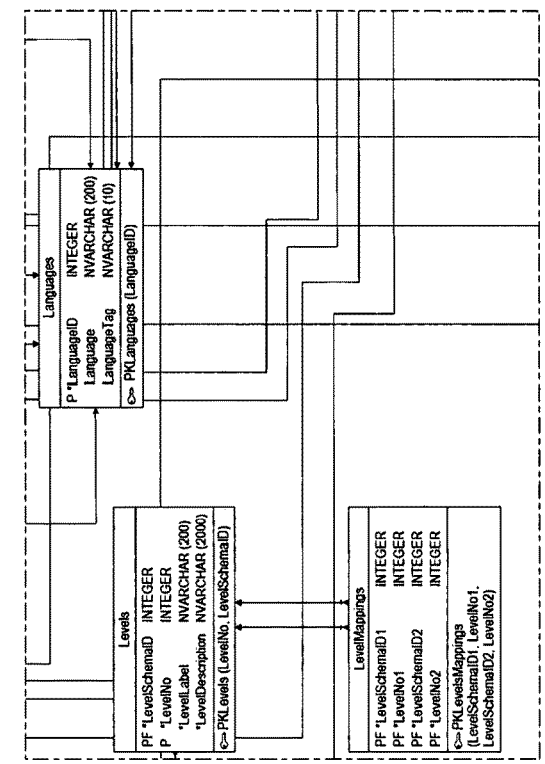
Figure 5k
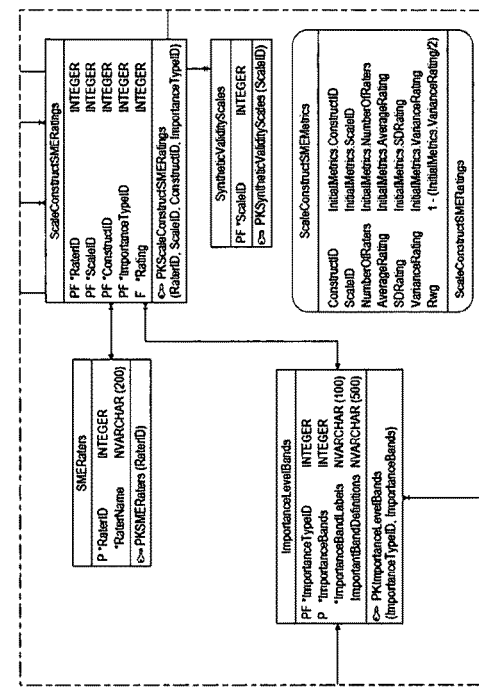
Figure 5o
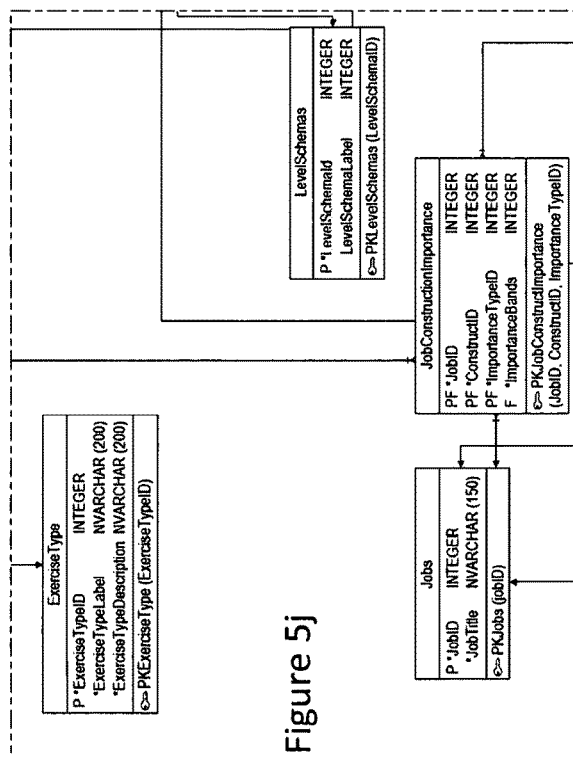
Figure 5j
Figure 5n

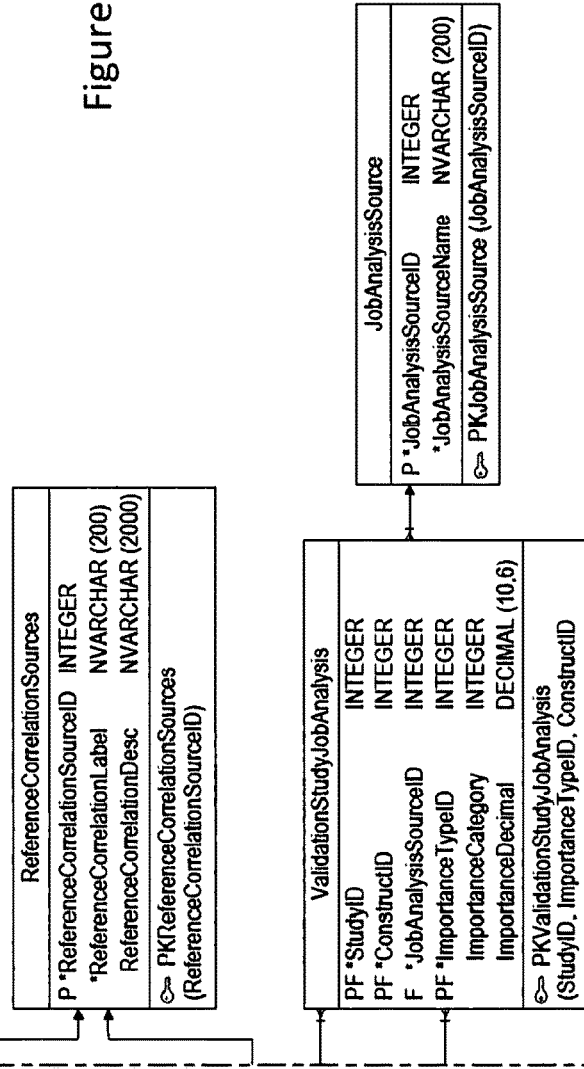
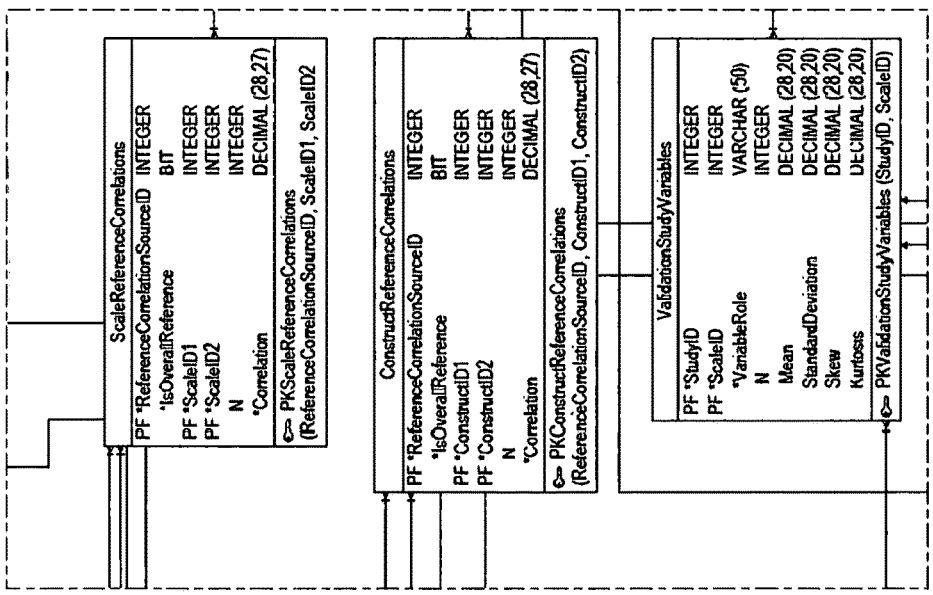
Figure 5m
Figure 5l

Figure 15

ASSESSMENT SYSTEM

This invention relates to an assessment system, in particular to methods of and apparatus for producing a targeted assessment scheme comprising a battery of tests or assessments and based on a plurality of requirements. The invention is of particular (although not exclusive) relevance to the assessment of candidates for a job or a role dependent on preferred competencies and character traits. A method of and apparatus for creating a synthetic norm for a composite test, comprising a plurality of tests, by combining the scores and/or score distributions from the plurality of tests, is also described.

Traditionally, the assessment and selection of a candidate for a job or role has primarily made use of the interview method, wherein the candidate is assessed directly and in person by means of conversation with the prospective employer. This function has in many companies increasingly been delegated to personnel or human resources departments, if not outsourced entirely, particularly at the initial screening stage. Candidates are now routinely assessed by means of tests which seek to filter out those candidates with particular skills, qualifications, experience, competencies and qualities as desired by the employer for the particular job. However, as the complexity of the assessment process increases (and, some might argue, becomes increasingly critical), designing and ensuring the quality of the process has become an increasingly skilled task, often required teams of highly-trained psychologists to devise suitable assessment schemes, to supervise their administration and to interpret the results. This can be costly and also scales poorly.

The present invention aims to provide a system that allows users to create a valid, multi-trait, multi-method candidate assessment for use in employment decisions, including personnel selection and promotion, based on inputs primarily related to the job requirements. Previously, only experts could build such a system.

Generally, there is provided a method of and apparatus for producing or generating a targeted assessment scheme for assessing a candidate based on a plurality of requirements.

According to an aspect of the invention there is provided a method of producing an assessment scheme for assessing the suitability of a candidate, the method comprising: receiving as input from a user at least one candidate requirement and at least one candidate test identifier; constructing a candidate assessment comprising at least one test in dependence on the test identifier; analysing the candidate assessment in dependence on the requirement to predict the accuracy of the assessment in identifying a suitable candidate; and reporting on the predicted accuracy of the candidate assessment.

Preferably, the assessment scheme is for assessing the suitably of a candidate or a plurality of candidates for a job or role.

Preferably, the assessment scheme comprises a plurality or battery of tests. Each test may be designed to test one or more aspects of the candidate.

The inputs comprise one or more of: the identification or definition of a role or job; a required outcome, such as a business outcome and a design strategy. The business outcome may be one or more of: retention, performance and readiness. The design strategy may relate an aspect of the assessment scheme, such as one or more of: predictive power, validity, fairness, adverse impact, efficiency and brevity.

The components may be competencies, skills, experience and other requirements. In some embodiments the method comprises receiving an analysis of the job or role from an external source.

Preferably, the method further comprises a rules-based analysis of the assessment scheme. This may compare the assessment scheme with others already in existence or previously selected and/or with industry best-practice. Alternative assessment schemes or constituent tests may be proposed. Preferably, feedback regarding the analysis of the assessment scheme is provided to the user or assessment scheme designer as the assessment scheme is developed or assembled. The feedback may take the form of a scorecard.

According to another aspect of the invention, there is provided a method of creating a synthetic norm for a composite test, comprising a plurality of tests, by combining the scores and/or score distributions from the plurality of tests. Preferably, the method comprises analysing the score distribution for each test and classifying each test according to a distribution taxonomy. The analysis and/or classification may comprise calculating one or more of: mean, standard deviation, skewness and kurtosis of the test score distributions. Preferably, the method further comprises assigning a weighting to at least one test score distribution and combining the test score distributions in dependence on the weighting.

According to another aspect of the invention there is provided a graphical user interface representing the assessment scheme. Preferably, the assessment scheme comprises a plurality of tests or test components and each test is represented as a graphical element by the interface in a position which relates to the order in which a candidate would experience the tests during assessment. Preferably, at least one of the graphical elements is selectable (by a user or assessment scheme designer) and moveable to another position, thereby changing the ordering of the tests within the assessment scheme. Preferably, the graphical user interface is in the form of a funnel. Preferably, an indication of the initial pool or number of all candidates is shown at the mouth of the funnel and/or an indication of the resultant pool or number of candidates is shown at the exit of the funnel, More preferably, the resultant pool or number of candidates is shown for at least one of the plurality of tests of the assessment scheme.

According to an aspect of the invention there is provided apparatus for producing an assessment scheme for assessing the suitability of a candidate, the apparatus comprising: means for receiving as input from a user at least one candidate requirement and at least one candidate test identifier; means for constructing a candidate assessment comprising at least one test in dependence on the test identifier; means for analysing the candidate assessment in dependence on the requirement to predict the accuracy of the assessment in identifying a suitable candidate; and means for reporting on the predicted accuracy of the candidate assessment.

Preferably, the apparatus further comprises means for analysing the job or role into constituent components. In some embodiments the apparatus comprises means for receiving an analysis of the job or role from an external source.

Preferably, the apparatus further comprises means for performing a rules-based analysis of the assessment scheme. Preferably, the apparatus comprises means for providing feedback regarding the analysis of the assessment scheme to the user or assessment scheme designer as the assessment scheme is developed or assembled.

According to another aspect of the invention, there is provided apparatus for creating a synthetic norm for a composite test, comprising a plurality of tests, by combining the scores and/or score distributions from the plurality of tests. Preferably, the apparatus comprises manes for analysing the score distribution for each test and means for classifying each test according to a distribution taxonomy. Preferably, the apparatus further comprises means for assigning a weighting to at least one test score distribution and combining the test score distributions in dependence on the weighting.

The invention may also provide one, some or all of the following, in any appropriate combination:
  System for providing a plurality or battery of tests, assembling test components
  Job or role analysis and assessment system
  Scalability
  Modular assessment/test construction
  Adherence to best-practice and compliance with standards, legislation (such as employment law) in respect of recruitment, avoiding bias or prejudice in decisions related to hiring or promotion As used herein, the term "solution" is commonly understood to refer to a plurality or battery of tests or assessments. A solution may combine multiple tests or batteries of tests, resulting in a "composite score" or combined score for a particular candidate, preferably allowing for multiple candidates to be ranked accordingly.

The following acronyms are used herein:
  JAQ—Job Analysis Questionnaire
  UCF—Universal Competency Framework (SHL proprietary competency structure)
  WBD—Work Behaviour Dimensions (Similar to competencies; the unit of analysing a job above the individual item to be rated, or alternatively, the aggregation of multiple JAQ items that represent a distinct competency.
  SDS—Solution Design System (SHL proprietary system for combining multiple individual assessments which may inherently utilise different norms and scoring.
  CAT—Computer Adaptive Testing
  SJT—Situational Judgment Tests
  MMSJT—Multimedia Situational Judgment Tests
  PCAPS—Previsor Computer Adaptive Personality Scales (SHL proprietary personality assessment that uses CAT principles; synonymous with GPI-A)
  GPI-A—Global Personality Inventory Adaptive (SHL proprietary personality assessment that uses CAT principles; synonymous with PCAPS)
  JPR—Job Performance Rating form As used herein, the following terms may be used interchangeably:
  Constructing, developing and assembling (and constructed, developed and assembled)
  Test and assessment Embodiments of the assessment system may be referred to as ASDS.

The system and processes described may also interact with and make use of those described in the following documents, which are incorporated herein in their entirety by reference:
  International Patent Application No. PCT/GB2012/052198, entitled "Analytics", published as WO2013/034917, which describes apparatus for and a method of providing access to comparison metrics data relating to the comparison of a test or target group with a reference group, such as a benchmark group. An analytics system is also described. This has particular relevance in the sphere of talent management. In some embodiments, this allows for a user or organisation to determine or identify a parameter such as a "benchstrength" in talent acquisition (recruitment and selection), talent development and succession against a number of defined metrics through which actions to improve their talent management processes can be identified.
  International Patent Application No. PCT/GB2012/052419, entitled "Requirements characterisation", published as WO2013/045949 (the system described being at times referred to herein as "JobMatch"), which describes apparatus for and method of providing a requirements characterisation profile for an entity. In particular, this allows for the translation of a generic requirements request into a specific requirements request. Described variants may also allow for translation between different models of requirements between different organisations, for the review and revision of the resulting requirements request, and may also provide recommendations of suitable assessments for determining whether the determined requirements are met.
  Co-pending international patent application PCT/GB2013/000170, entitled "Testing System", published as WO2013/156746, which describes a testing system including apparatus for and methods of testing a subject according to a forced-choice scheme. In particular, a dynamic forced-choice testing system is described, based on Thurstonian item-response theory. The system described therein is at times referred to herein as "Atlas".
  U.S. Pat. No. 7,606,778, entitled "Electronic prediction system for assessing a suitability of job applicants for an employer".
  U.S. Pat. No. 8,086,558, entitled "Computer-implemented system for human resources management".

Further features of the invention are characterised by the dependent claims, where appended.

The invention also provides a computer program and a computer program product for carrying out any of the methods described herein, and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein, and/or for embodying any of the apparatus features described herein, a method of transmitting such a signal, and a computer product having an operating system which supports a computer program for carrying out the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied as apparatus aspects, and vice versa.

Equally, the invention may comprise any feature as described, whether singly or in any appropriate combination.

It should also be appreciated that particular combinations of the various features described and defined in any aspects of the invention can be implemented and/or supplied and/or used independently.

Furthermore, features implemented in hardware may generally be implemented in software, and vice versa. Any reference to software and hardware features herein should be construed accordingly.

The invention will now be described, purely by way of example, with reference to the accompanying drawings, in which:

FIG. 15 shows an example of a GUI used in the assessment configuration phase of the assessment construction process;

OVERVIEW

Figure 1:
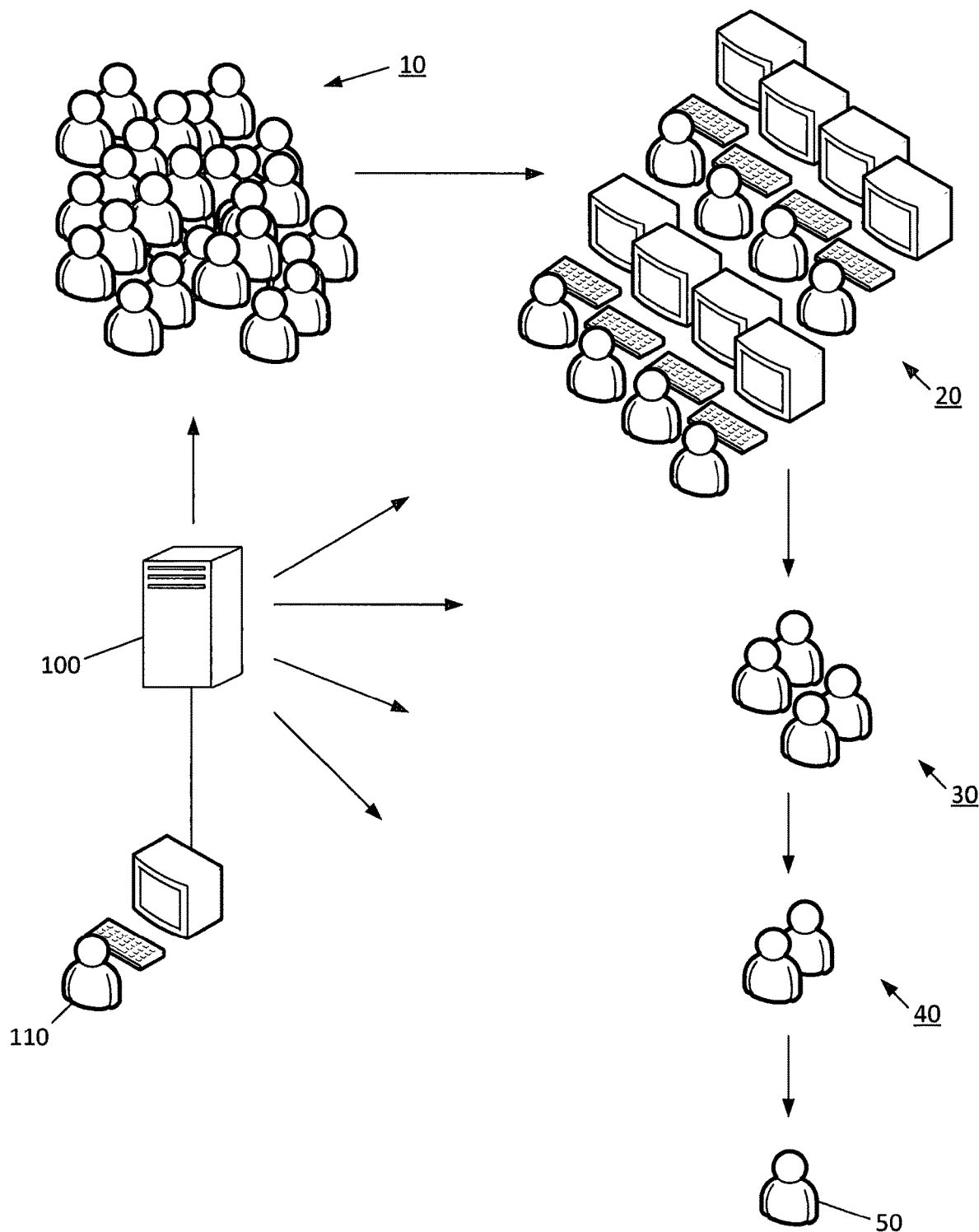
FIG. 1 shows an assessment process in overview.

FIG. 1 shows an assessment process in overview. The assessment of the suitability of a plurality of candidates 10 for a job or role is a process of several stages, typically involving initial screening 20, more focussed testing 30 (potentially a telephone interview) and finally a personal interview 40—before the successful candidate 50 is offered the job or role.

The design of the assessment process is therefore critical in ensuring the most suitable candidate is selected.

System 100 allows a user 110 to create a valid (as in, based on research evidence), multi-trait, multi-method candidate assessment for use in employment decisions, including personnel selection and promotion, by inputting information about job requirements (competency and skill requirements) and administration process (number of process steps, their order, languages to be used, form of reporting).

Figure 2:
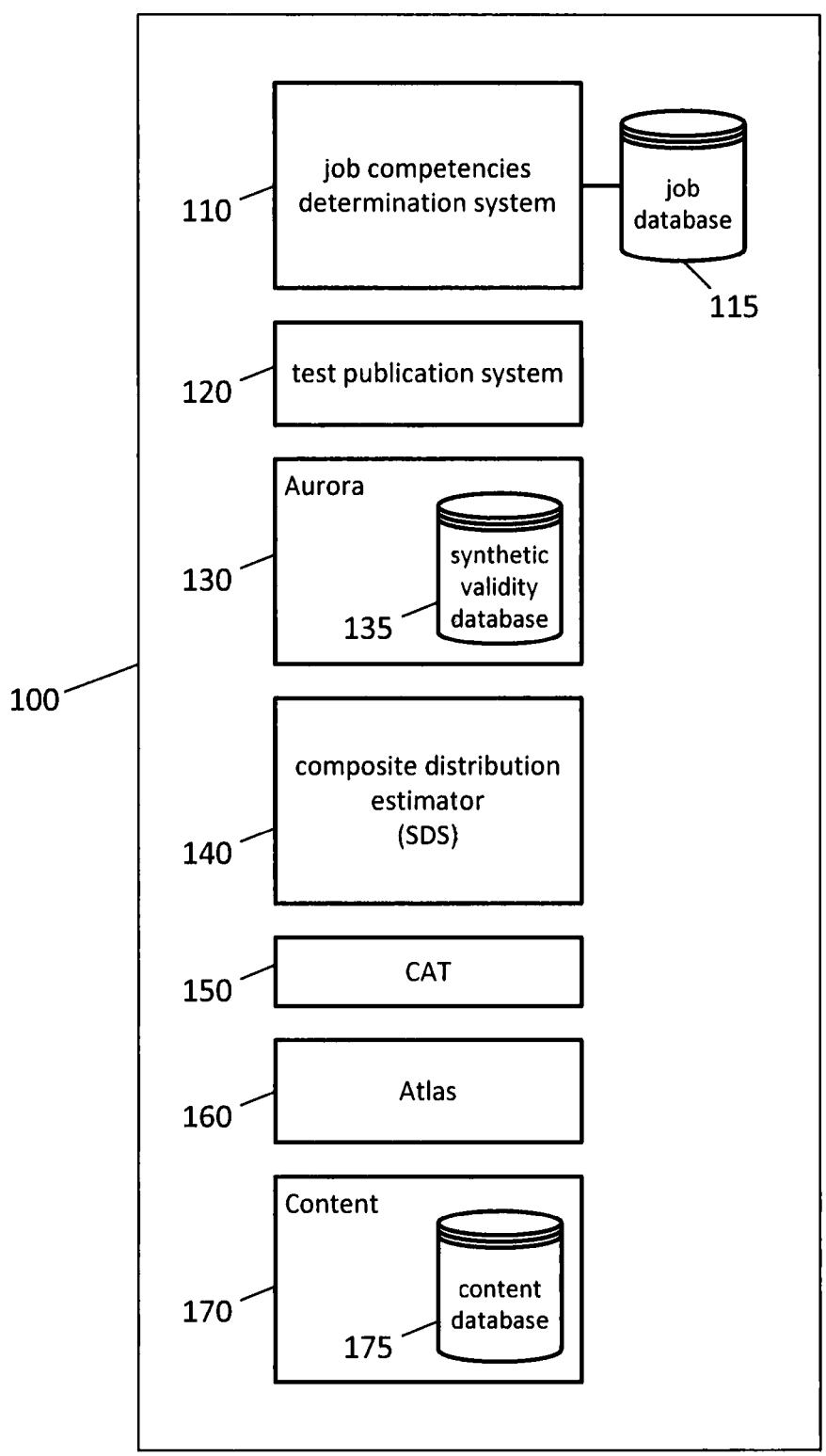
FIG. 2 shows the main components and high level process flow of the assessment system.

FIG. 2 shows the main components and high level process flow of the assessment system 100, which comprises:
  Job competencies determination system (Job Analysis)
  Assessment configuration system 120
  Synthetic validity database 130 ("Aurora")
  Composite distribution estimator 140 ("Solution Design System" or SDS—described in more detail below)
  Computer Adaptive Testing system 150 (CAT)
  Atlas (system, content) 160—also described in more detail below
  Content 170
  Test publication, administration, and reporting system These various modules may be implemented on one or more computer servers.

Suitable computer servers may run common operating systems such as the Windows systems provided by Microsoft Corporation, OS X provided by Apple, various Linux or Unix systems or any other suitable operating system.

Suitable databases include ones based on SQL, for example as provided by Microsoft Corporation or those from Oracle or others.

Embodiments of the invention may also be implemented in Microsoft Excel or similar business software.

An optional web server provides remote access to the assessment system via a website or other remotely-accessible interface. Web interfaces and other code may be written in any suitable language including PHP and JavaScript. A Microsoft .Net based stack may be used.

The Modular test publication system 120 operates at the "scale" (component) level. Traditionally, test publishers publish fixed multi-trait tests (e.g., personality tests) or multi-dimensional single trait tests (e.g., cognitive ability battery).

Aurora 130 refers to a system or process adapted to make use of the ideas of "synthetic validity" and "validity transportability", wherein jobs or roles are deconstructed into their constituent components aligned to competencies and the results used to determine how best to assess candidates for particular jobs or roles. In effect, an analysis of a job A into relevant competency components (for example, using components based on the SHL universal competency framework or UCF) is used to determine which of a battery of tests is most suitable for assessing candidates for a different job B. Such a system is preferably based on a large database of candidate assessments (pre-role), and also on a database of assessments of candidate performance when actually in the roles. Based on known properties of a large pool of assessment components that have been linked to relevant competency components, a calculation can be performed to project the likely effectiveness of optimally selected assessments in predicting future levels of job performance.

Figure 3:
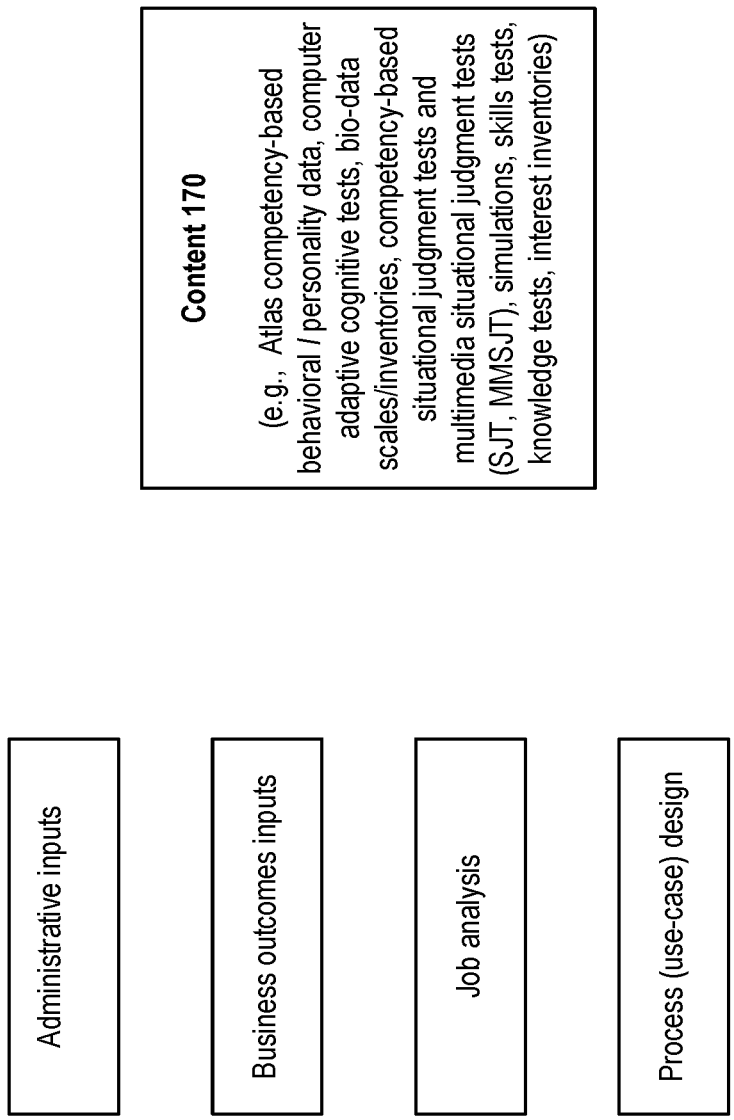
FIG. 3 shows a database architecture diagram for the synthetic validity component of the assessment system.

FIG. 3 shows a database architecture diagram for the synthetic validity component of the assessment system.

Content 170 may comprise data such as Atlas competency-based behavioural/personality, computer adaptive cognitive tests, bio-data scales/inventories, competency-based situational judgment tests and multimedia situational judgment tests (SJT, MMSJT), simulations, skills tests, knowledge tests, interest inventories Further notable features include:
  Design dashboard/scorecard describing features of the assessment solution produced by the system in response to user inputs; such features may include candidate experience, length, adverse impact, validity, competency coverage e.g. "Human body" graphic or avatar for solution completeness;
  Process "funnel graphic" and drag-and-drop functionality for administration process design.

In Operation

The following describes a typical operation of an embodiment of the system. It is envisaged that a typical user will have knowledge of the job requirements in terms of competencies (at a general level) and skills, but not have detailed training in psychology.

The process begins with the user being requested for input in order to define certain operating parameters.

1. Administrative Inputs

Initial parameters are set by the user or otherwise determined. Some of these may involve inputs from other systems, for example job competency specification data from a system such as JobMatch.

Typical initial inputs include:
User roles—may be selected or defined
Existing solutions may be selected (eg. via copy-and-paste) from the user's account
Solutions may be assigned to "jobs"
Set-up and define integration with workflows and systems
Specify scoring output to appropriate systems Additional features which may be provided in some embodiments at this stage include:
Embedded training modules on system use, assessment best practices, process design, etc.
Contextualized help and "ask an expert" features
Social features—connecting users to compare solutions, job requirements, etc.
Embedded help with disability accommodations requests (general best practices, alternative content suggestions, directed to other resources, etc.)
Branding of site and solutions 2. Business Outcomes Inputs Here the user is requested to indicate the desired outcome in terms of business outcomes that the assessment is supposed to achieve. Typical business outcomes include:
retention
performance
day-one readiness (as in, ability in terms of specific knowledge, skills to begin the job immediately, without requiring initial training or much in the way of orientation)

The objectives/metrics are ranked (typically according to desirability) according to a rules database.

Optionally, helpful tips are provided to the user, for example, in respect of retention, what content/design works, other things to consider besides assessment, etc.

3. Job Analysis

Here the job is analysed into constituent competencies and other requirements. Various approaches may be used for this stage of the process.

The use of a requirements characterisation profile as obtained from a job specification profiling tool such as JobMatch may be especially beneficial. JobMatch in particular may offer multiple ways of determining job requirements, for example:
single-user/reviewer (or "rater") mode (requirements determined by setting perceived job characteristics/requirements on a sliding scale, for example using a graphical interface comprising an array of 'sliders' to set a particular characteristics on a scale from high/essential to low/non-essential)
multiple rater mode (initial job characteristics/requirements are forwarded or circulated to other relevant parties for feedback and/or adjustment; result is presented as a suggested amended competency profile or a composite profile is generated)
based (at least in part) on Job Assessment Questionnaires (JAQ), which typically comprise a set of behavioural statements the importance of which for the job has been indicated, such as:

confirmatory JAQ, based on a third party understanding of the job
exploratory JAQ, based on a larger questionnaire and absent an initial job assessment (the nature of the job being unknown or imprecisely undefined)
strategic JAQ, especially relevant for rapidly-changing job and/or industry sector, for forward planning for an uncertain future job character
JAQ are commonly used in combination with multiple raters, who are subject matter experts in the job concerned.
Where JobMatch has insufficient data to form the basis of a recommendation the user is alerted and a recommendation for exploratory job analysis is made.
based on a Day-One Readiness questionnaire (on specific skills/knowledge required for the job, potentially determined from a UCF-based analysis, if not already covered by an exploratory JAQ)

4. Process (Use-Case) Design

The user is requested to select an overarching design strategy or disposition. This will almost inevitably require some compromise or trade-offs to be made, for example, in respect of prediction/validity, fairness/no adverse impact, efficiency/brevity or duration.

An ipsative ("forced-choice") list of goals/values may be used.

The steps described in this stage are not necessarily performed in the sequential order presented below. A rank ordering is used for the constituent processes to enable a rules-based approach.

Figure 4:
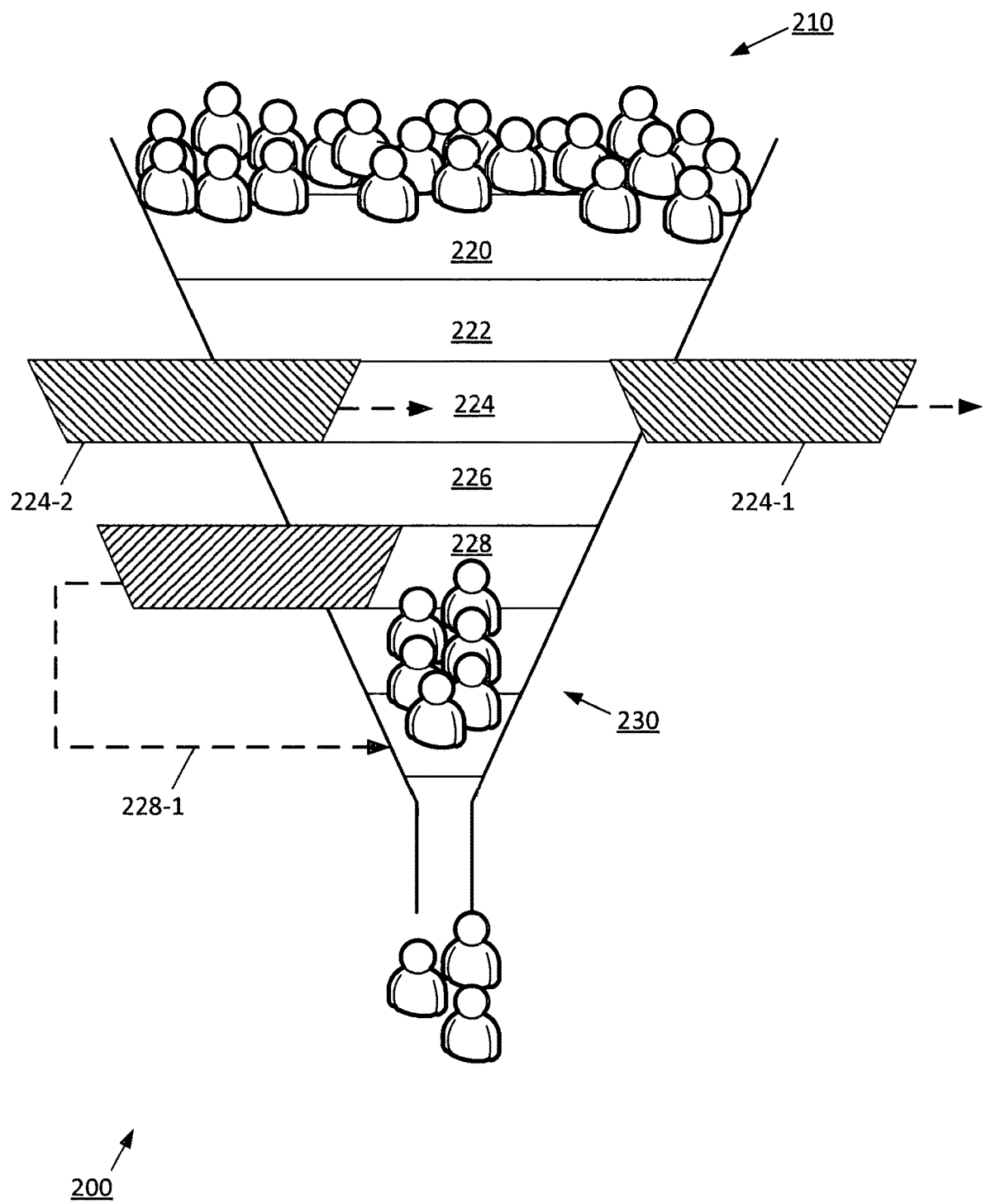
FIG. 4 shows an example of a process funnel interface.

Other aspects to be determined and features include:
Is the process is to be multi-stage? Is confirmation testing to be used?
Use of a drag-and-drop multi-stage recruiting/administration process funnel interface
Inclusion of pass rates (e.g. "% candidates to be screened in/out") and decision rules
Country of use/language requirements
Mobile device use requirements
Application form designer, to capture candidate/employee demographic information, including name, contact information, job history, and minimum/basic qualifications,
Minimum/basic qualifications list (which can include scoring, hurdles, etc.) to accommodate any 'hard' requirements FIG. 4 shows an example of the process funnel interface 200. This provides a graphical representation of the assessment process. The initial pool of all candidates 210 are shown entering at the mouth of the funnel 200 successive assessment tests 220, 222, 224, 226, 228 are applied to the pool of candidates, screening some out and decreasing the remaining number until a significantly smaller resultant pool of candidates 230 exits the funnel, either to proceed to a final stage of assessment or to be offered a job or role. Individual tests 224, 228 may be selected by the user (the designer of the assessment) and moved 228-1 to an alternative position in the funnel, altering the coder in which the candidates encounter the tests in the assessment process. Tests may also be removed from the funnel entirely 224-2, optionally parked for possible later re-introduction, and/or new tests introduced 224-1.

Rules may be applied to ensure the resultant set of assessments is realistic eg. for reasons of scale it is unlikely that the initial test ought to be an interview, rather a typical assessment series/solution would involve an initial screening assessment, followed by a phone interview, then a selection assessment conducted in person, and an interview in person.

The funnel metaphor allows the assessment designer to gain an overview of the flow of candidates through the assessment process, the taper in the number of candidates in the pool as the assessment progresses being clearly represented. The consequences of altering the sequence, decision rules, and/or type of tests at different stages are immediately evident. The representation of candidate volume at each stage may be shown numerically (eg. as a number or percentage) or graphically.

The system may provide assistance in the form of contextual help (eg. as pop-up balloons) to assist in the design of an optimised assessment process. Rules may determine and advise on whether a chosen sequence of tests is considered appropriate (eg. by comparison with the other tests already in existence or previously selected and/or with industry best-practice) and appropriate warnings and/or alternative suggestions provided.

5. Content Selection from Modular Assessment Content Library

In order to function with the rules-based system described, the content library (comprising various test scores, competency profiles and the like) may first need to be suitably coded with additional metadata. The resulting cultivated content library may be coded across multiple domains by competency coverage, content type, candidate experience, language availability, etc.

There are then various options for the basis on which content is selected from the content library. Examples include:

- System-recommended solution based on inputs—either a standard solution (eg. where the job specification appears to conform to a known standard) or a tailored solution designed uniquely to user inputs/requirements
- Graphical and/or tabular feedback to the designer—this may be for example via a representative avatar (tending to completion as the assessment is developed), the funnel metaphor described above, UCF or dashboard graphic or "scorecard" that shows how the assessment meets requirements. This may be variously augmented with further options offered, eg.
  - alternative configurations (typically, 1-2 options); or
  - if the pre-configured options are unsuitable (for example due to assessment time constraints or particular trait emphasis), the ability to drill-down into a prioritized list of content for consideration (for example, ordered by content categories, competencies covered, etc.), enabling the designer to re-arrange, add/remove or substitute individual elements
  - Preferably, the scorecard presents a real-time update, displaying say confidence, validity (for example, compared to the system recommended solution) or a benchmark comparison
- For benchmarking purposes—to allow for comparison or benchmarking of the client assessment solution against those in the same or similar industry, geography or other comparison or to case studies
- To conform with a validity estimator—whether obtained from a validity database, a meta-analysis tool and/or via synthetic validity algorithms (eg. Aurora), to rate how well an individual test or the solution as a whole is estimated to predict candidate performance
- As a result of interview content (the interview being optionally considered a part of the overall solution)
- From content-gap analysis—typically an analysis or system evaluation of a designed solution made prior to final publication, asking whether anything is missing, whether that be a culture fit or custom content, whether this content will address the intention of the solution and/or design strategy
- Other requirements eg. whether the test can be conducted on a mobile device
- Other impacts eg. the candidate experience, duration of the test Identified issues may be flagged at the end of the solution design and/or require signing off by the solution designer.

6. Composite Score Creation Using Solution Design System (SDS)

When seeking to combine tests (and award an overall assessment score for each candidate), some combinations of tests may not previously have been studied and data which would allow the computation of the corresponding norms may not be readily available. Further complications may arise when the score distribution curves for different tests are non-standard (e.g., highly skewed)

SDS solves this problem by combining scores from the various tests to create a synthetic norm for the composite test, thus obviating the need to run and evaluate real-world instances of the composite test in order to determine the expected score distribution.

Each test score distribution may be described mathematically by four key parameters: mean, standard deviation, skewness (related to the position of the distribution relative to the peak) and kurtosis (related to the peak width of the distribution).

Once described, the test score distribution curve is classified according to a specific taxonomy. An algorithm combines distribution curves in dependence on their classification according to this taxonomy, resulting in a composite test score distribution curve.

Optionally, SDS may be provided as a separate component.

In more detail, SDS makes use of a Composite Distribution Estimator, an application which calculates the score distribution of a simulated normative population based on the data entered and takes into account the non-standard distribution(s) of scores. The application takes all the normative data from the tests in a sitting along with their relative weights and information on how the tests correlate with each other. It then simulates instances of the sitting using a specified population size (usually 10,000). The output of the algorithm is the mean, standard deviation, skewness and kurtosis of the overall sitting score.

Typical user inputs for this stage may include one or more of:

- Choice of weights
- Set cut scores; reference desired pass rates and flag variance against funnel
- Choice of norms
- Late stage analytic "Risk analysis"—adverse impact and estimated validity based on design choices—a "red flag" alert may be provided where a generated solution differs markedly or in a significant aspect from a standard solution provided by the assessment system provider
- Solution review by others
- Ask an expert feature (e.g. solution is forwarded for review by the assessment system provider)
- Signoff on solution design, acceptance of responsibility, etc.

Publish, making the solution active and useable by candidates
7. Create Report from Elements, Style Sheets, etc. Using Report Generator
   Recruiter/Hiring manager report—report designed to support decision-makers
   Interview guides—report designed to support interviews with candidate/employee
   Development content—select development content from library of competency- and skill-based development tips, recommended actions/behaviors, e-learning courses, books and references, and other resources; user may optionally be allowed to enter specific development content or plans into system score reports
8. Technical Report Writer
   System generates a technical report documenting the inputs and foundation for proposed assessment solution and its predicted validity.
   Typically incorporating legal language required by legislation and/or an indication of how professional standards and guidelines for assessment system design have been accommodated
9. Demo/QA/Signoff Process
   Experience review by user, after which further customisation by the user may be allowed.
10. Administration of Solution to Candidates, Employees, or Other Target Populations
11. Post Implementation Evaluation and Optimization
   System-triggered notifications and/or processes based on solution publication or usage dates
   Local validation study option (with best practices built-in, minimum standards/reqs, etc.)
   Test taker reactions
   Test user reactions
   Solution editing/republication options
12. Focused Alerts
   Triggered based on system/solution usage
   Post implementation messaging/health-checks to assessment provider re: solution usage
   New client, new industry, new case-study . . . trigger outreach from assessment provider account management, marketing, sales, etc.
   Authentication of clients
Modifications and Alternatives In some embodiments, use is made of a system such as Atlas which may be used to generate a plurality of individualised yet standardised tests or test components (such as competency test forms or constituent forced-choice triplets) to be constructed. This may ensure that each candidate sits a uniquely tailored test without sacrificing test accuracy. Alternatively, static tests may be used.

In the main embodiment described above, the default configuration is set to ensure compliance with employment legislation and adherence with best-practice for a particular country of use or jurisdiction. In alternative embodiments options may be provided to allow compliance with the legislation a user-selected country—or alternatively for compliance for a determined set of countries, preferably in such cases adopting the most strict requirements.

Figure 5:
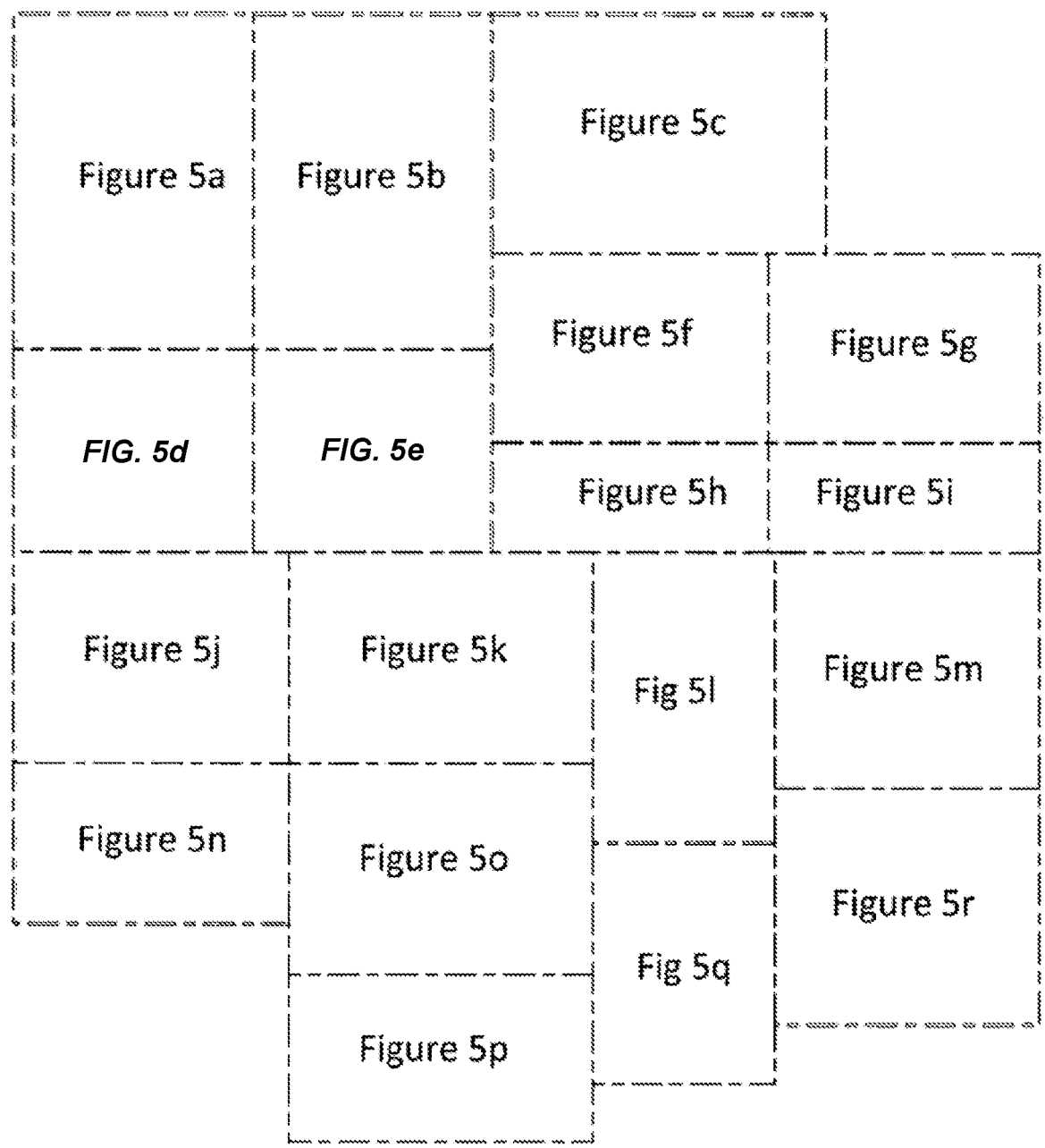
FIG. 5 show the database architecture diagram of FIG. 3 in greater detail.
Figure 5C:
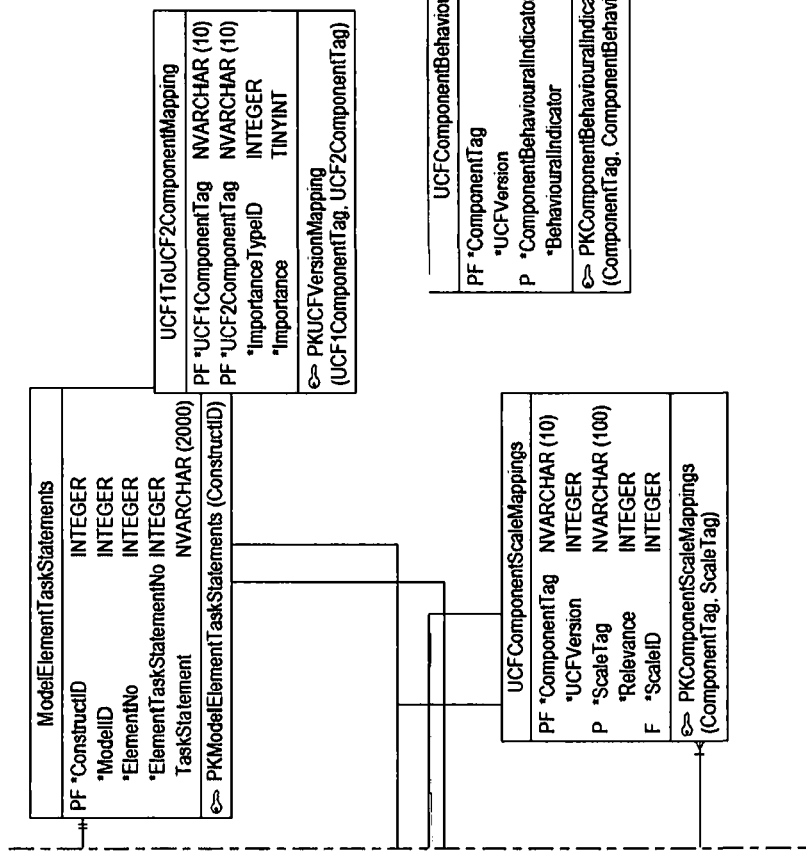
Figure 5F:
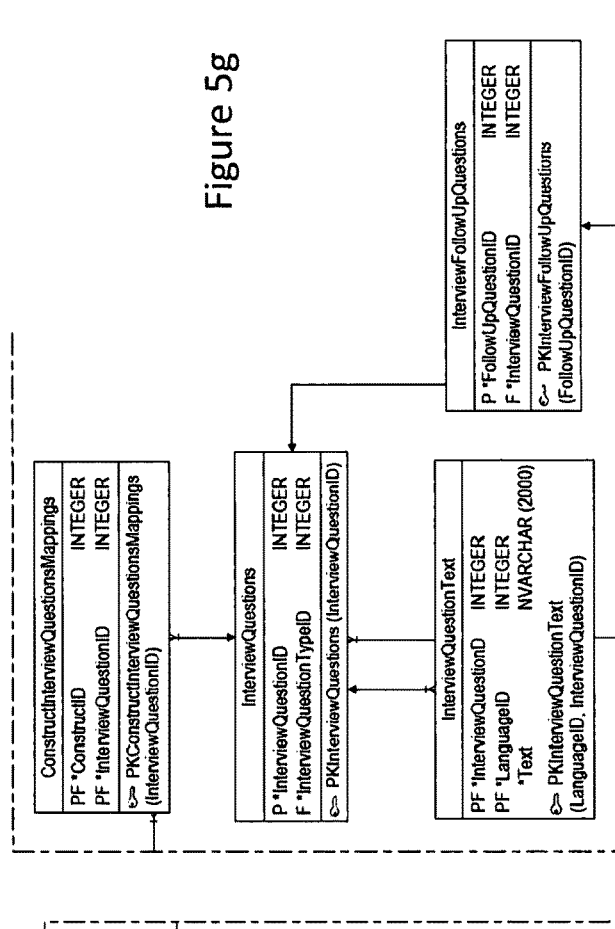
Figure 5G:
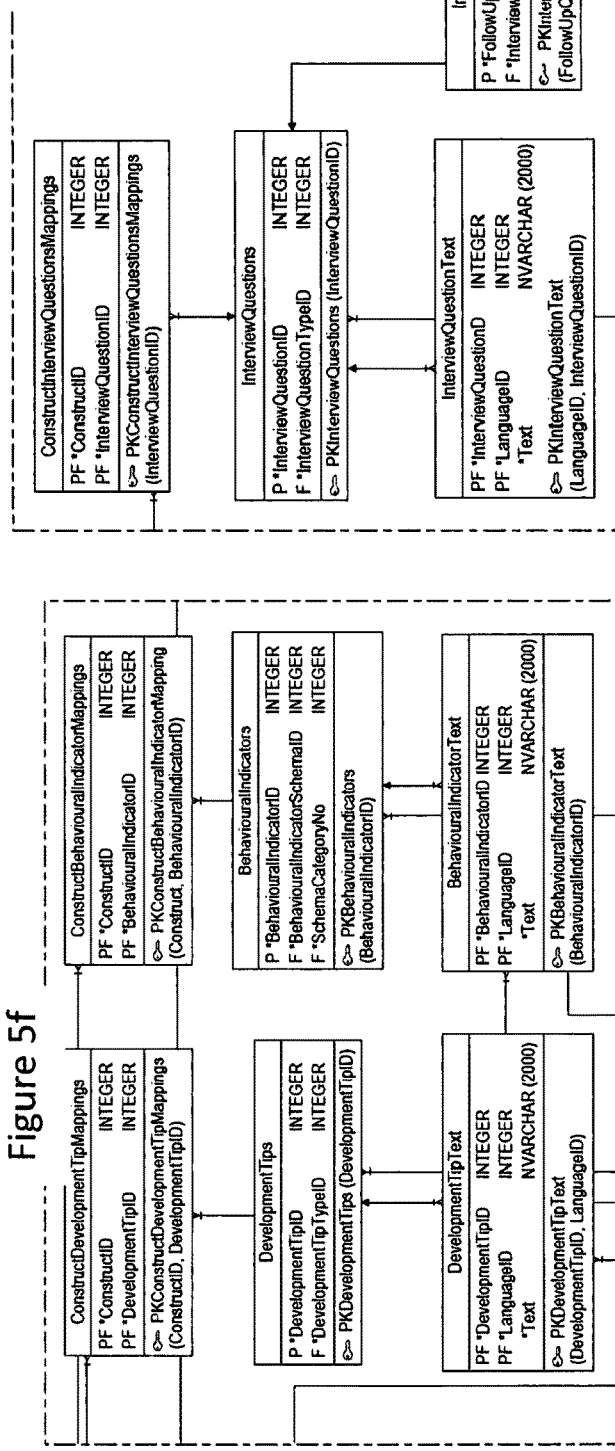
Figure 5H:
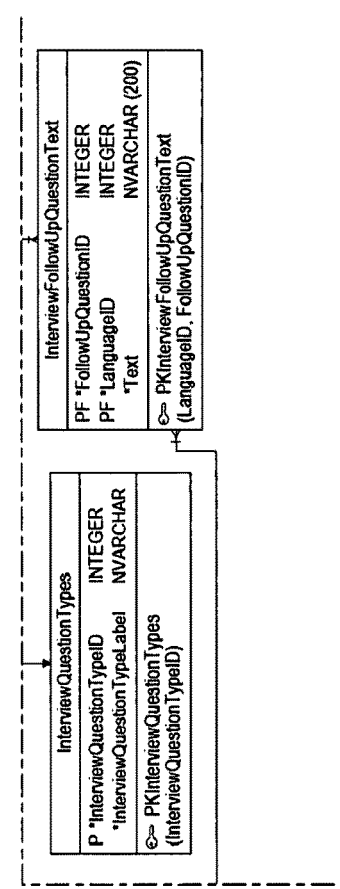
Figure 5I:
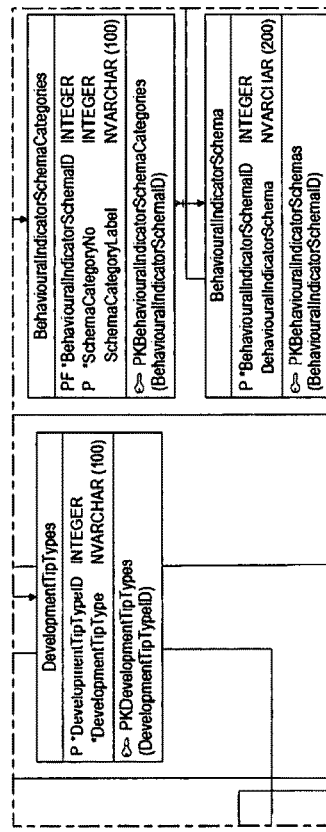
Figure 5P:
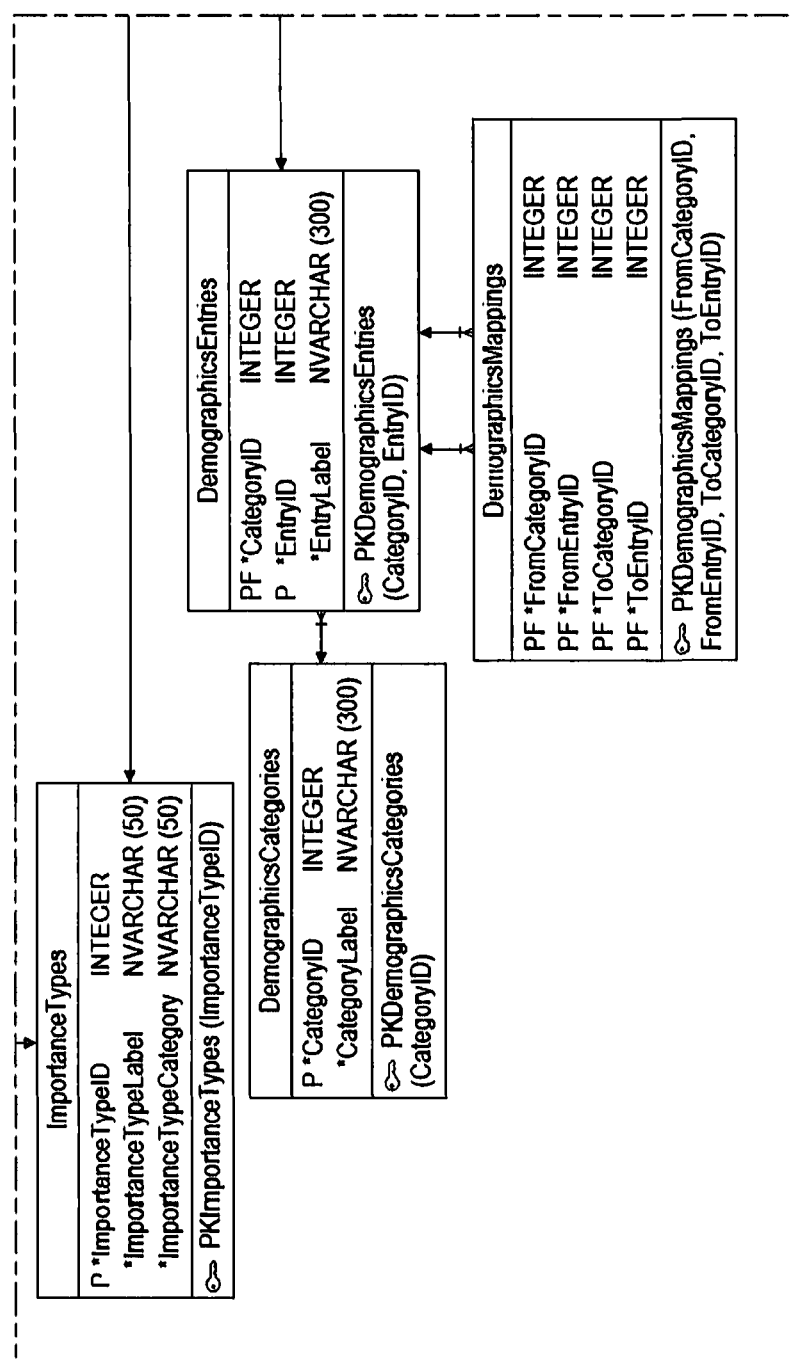
Figures 5Q, 5R:
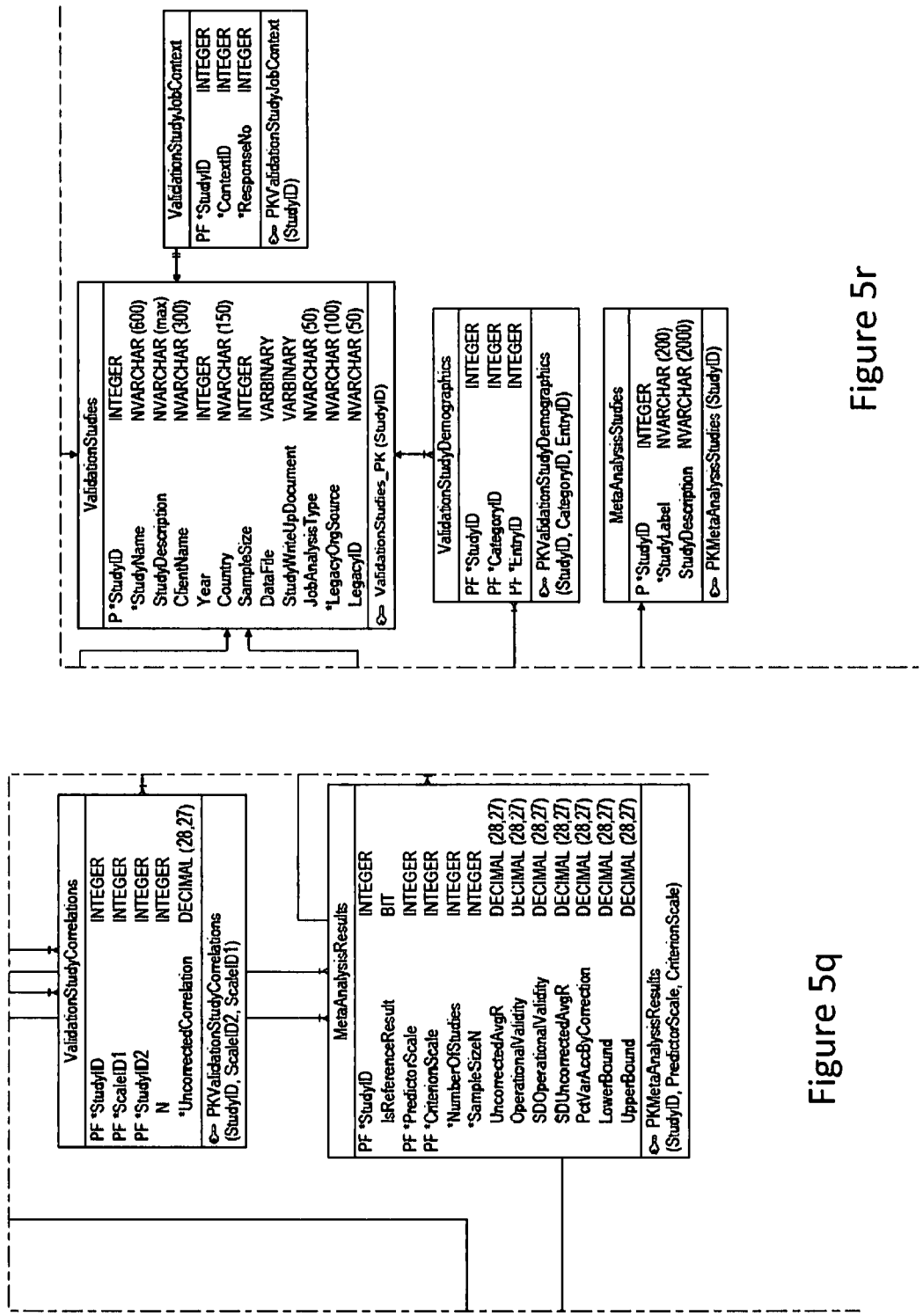

FIG. 5 show the database architecture diagram of FIG. 3 in more detail.

Figure 6:
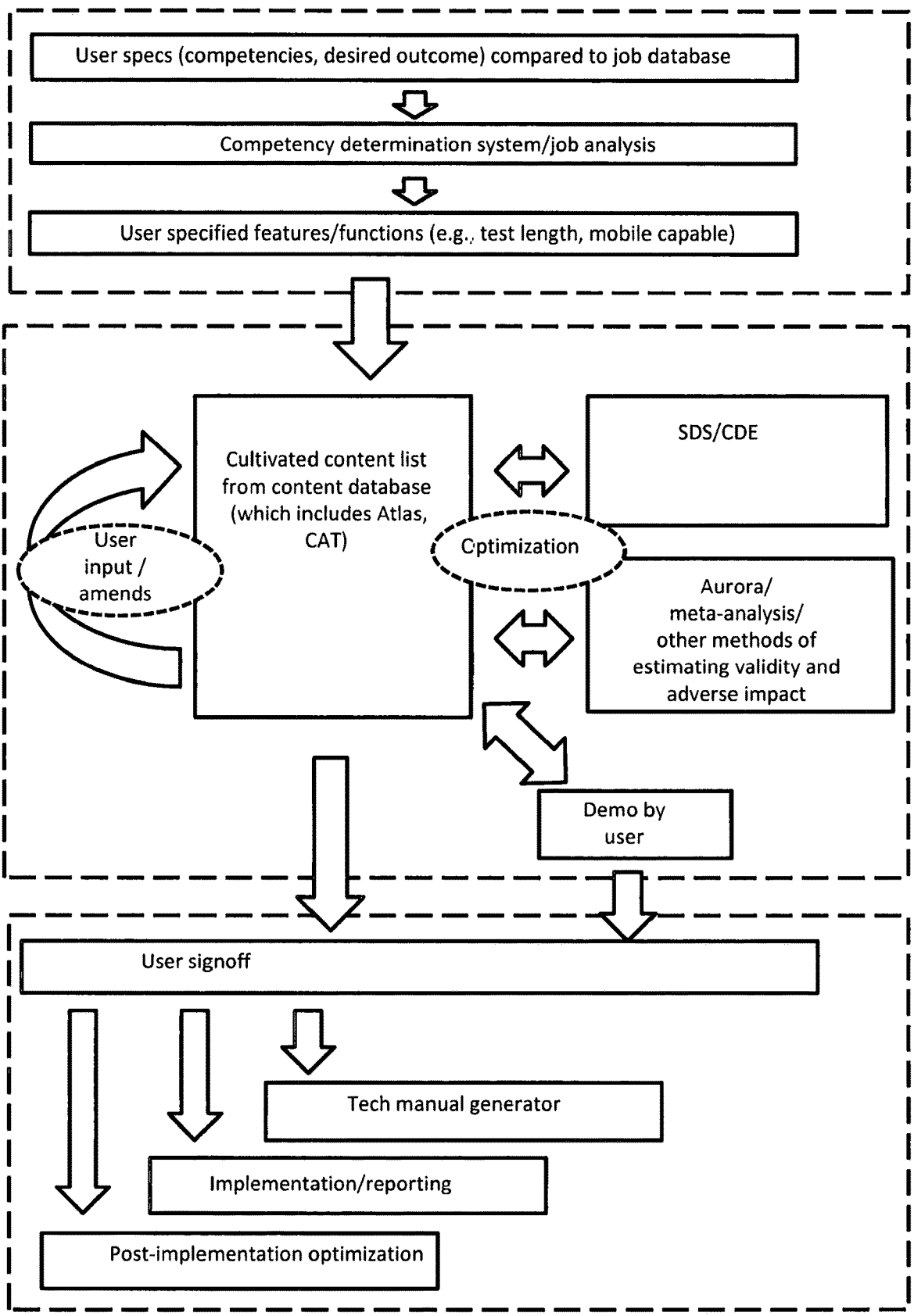
FIG. 6 shows the system workflow in further detail.

FIG. 6 shows the system workflow in further detail.

Figure 7:
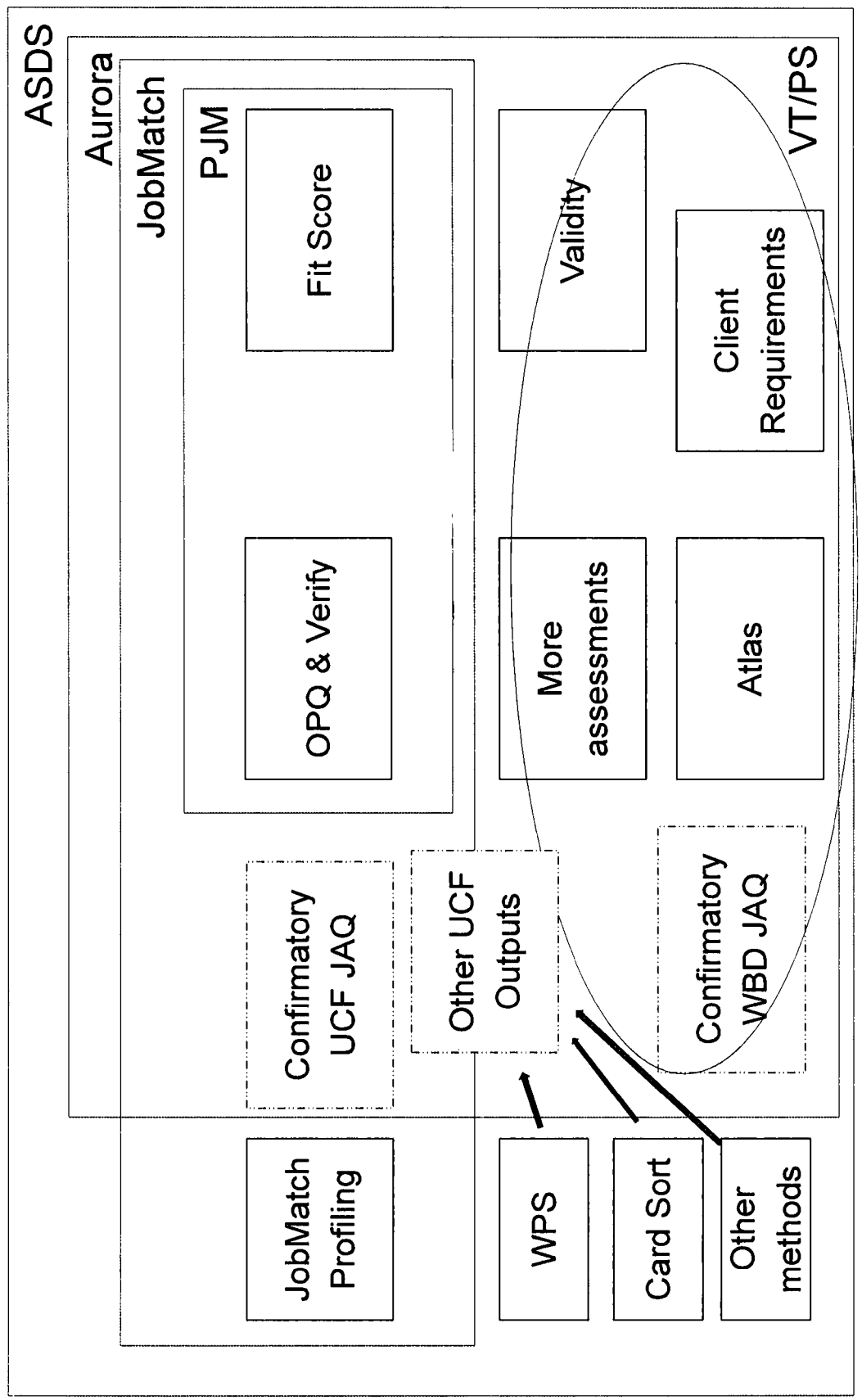
FIG. 7 shows the relationship of the assessment process to other systems and processes.

FIG. 7 shows the relationship of the assessment process to other systems and processes.

Further Embodiments

Figure 8:
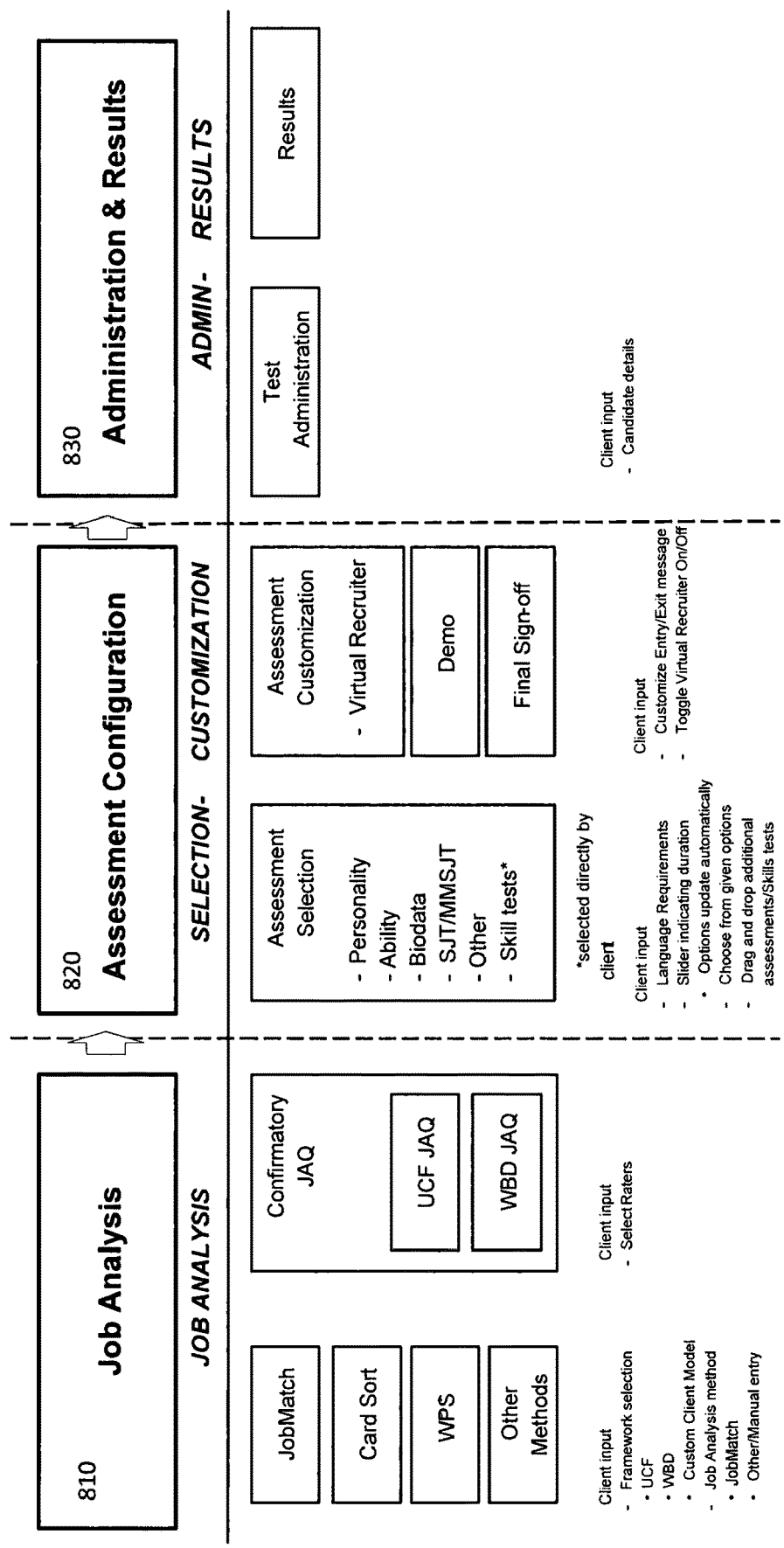
FIG. 8 shows an overview of a further embodiment of an assessment system.

FIG. 8 shows an overview of a further embodiment of an assessment system. The system comprises three phases:

1. Job analysis 810, during which the skill and competency requirements of the job are identified to produce a job profile
2. Assessment configuration 820, during which optimised assessments are generated from the job profile and other user selected options, and then further customised by the user
3. Administration and results of the resulting assessment solution 830, which may include validation of the assessment.

Figure 9:
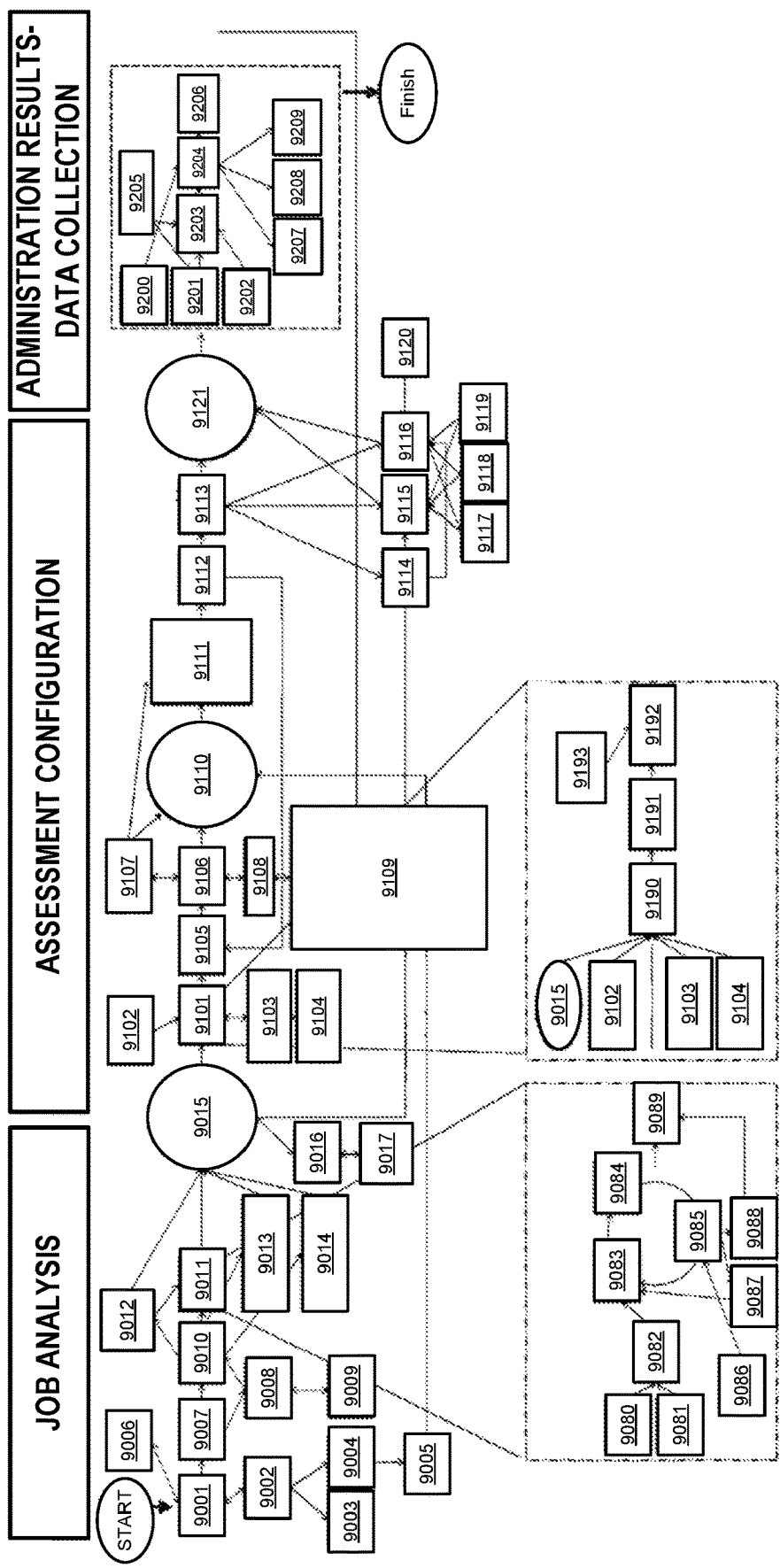
FIG. 9 shows a detailed flow diagram of an assessment construction process.
Figure 9A:
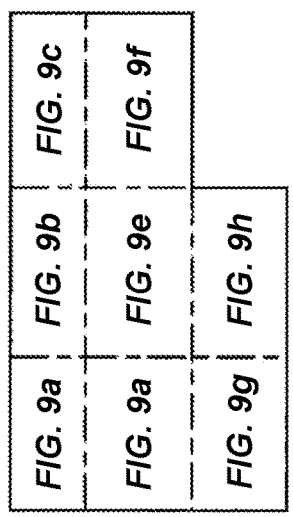
Figure 9A:
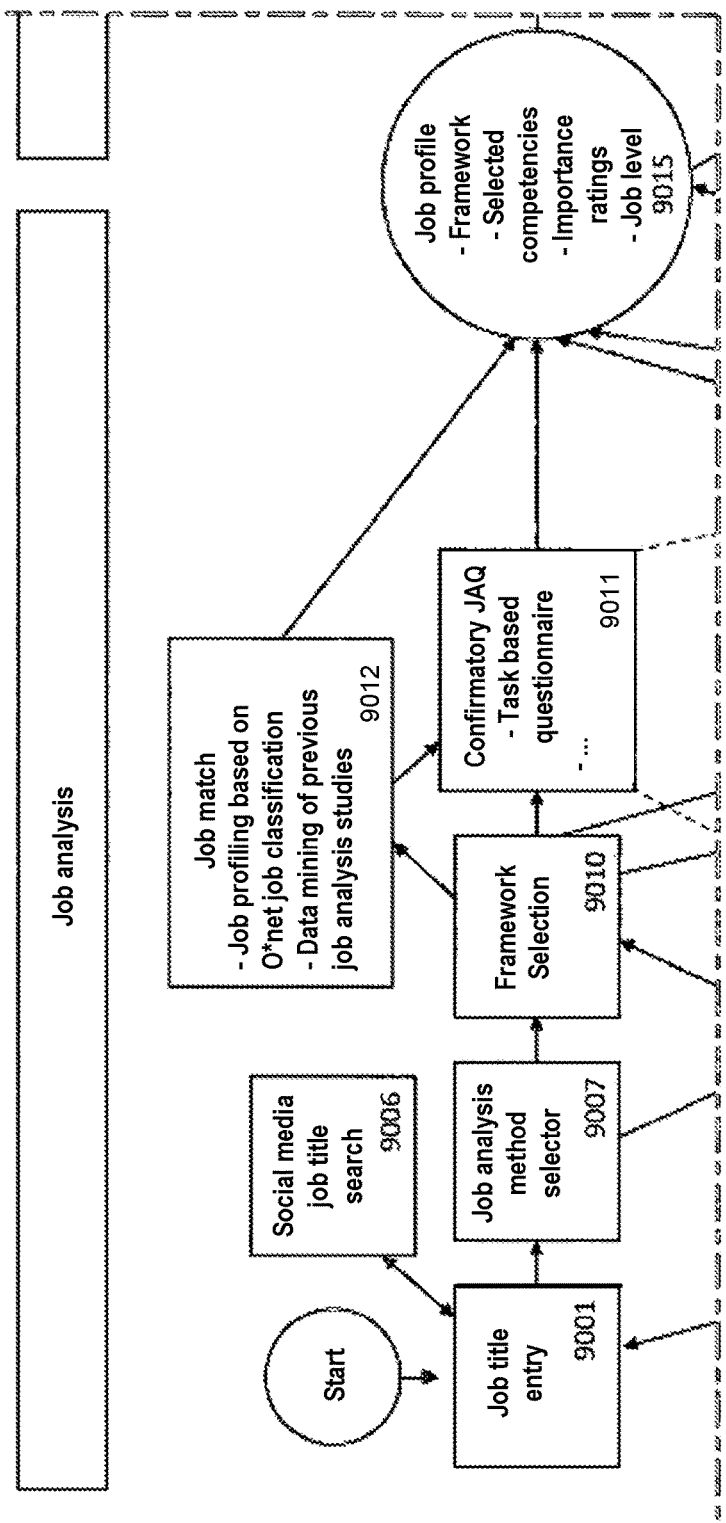
Figure 9B:
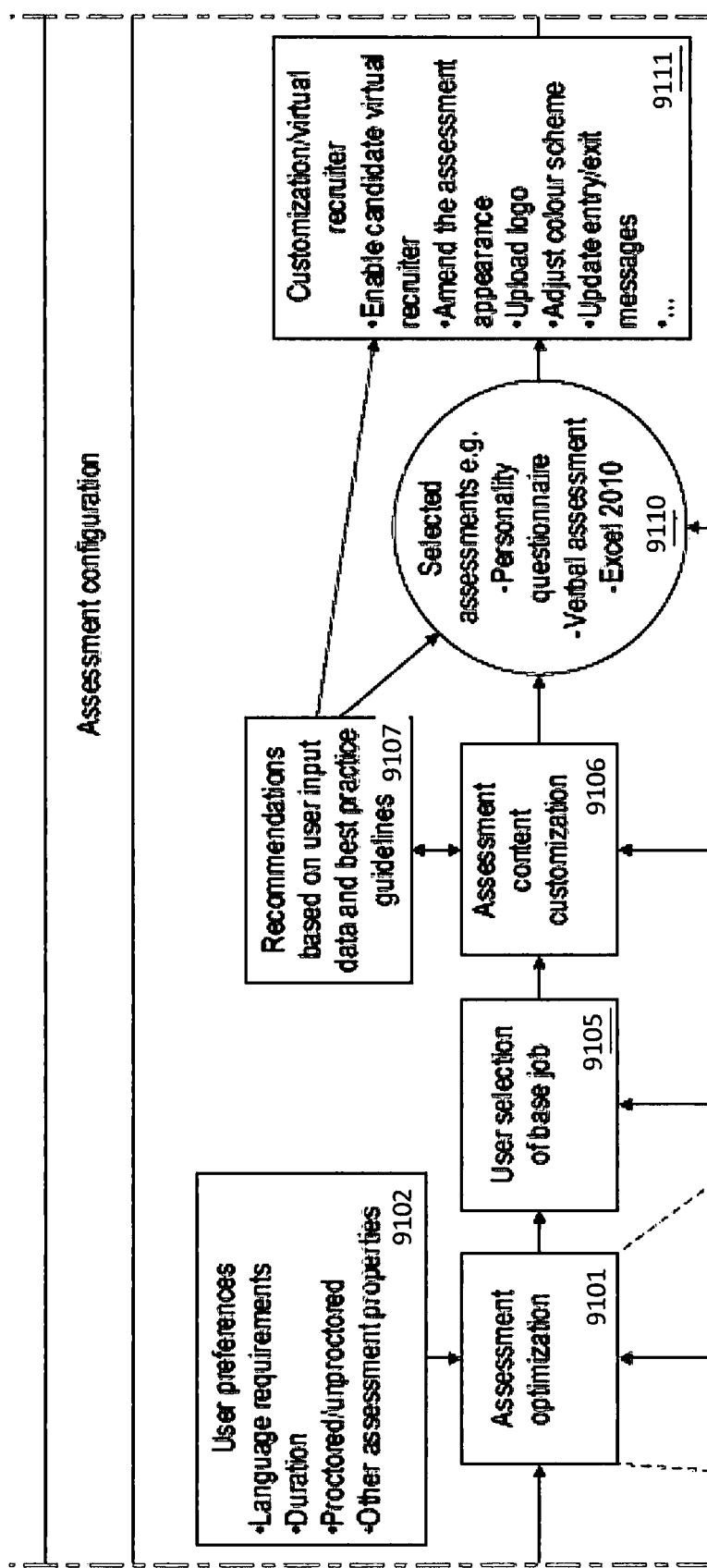
Figure 9C:
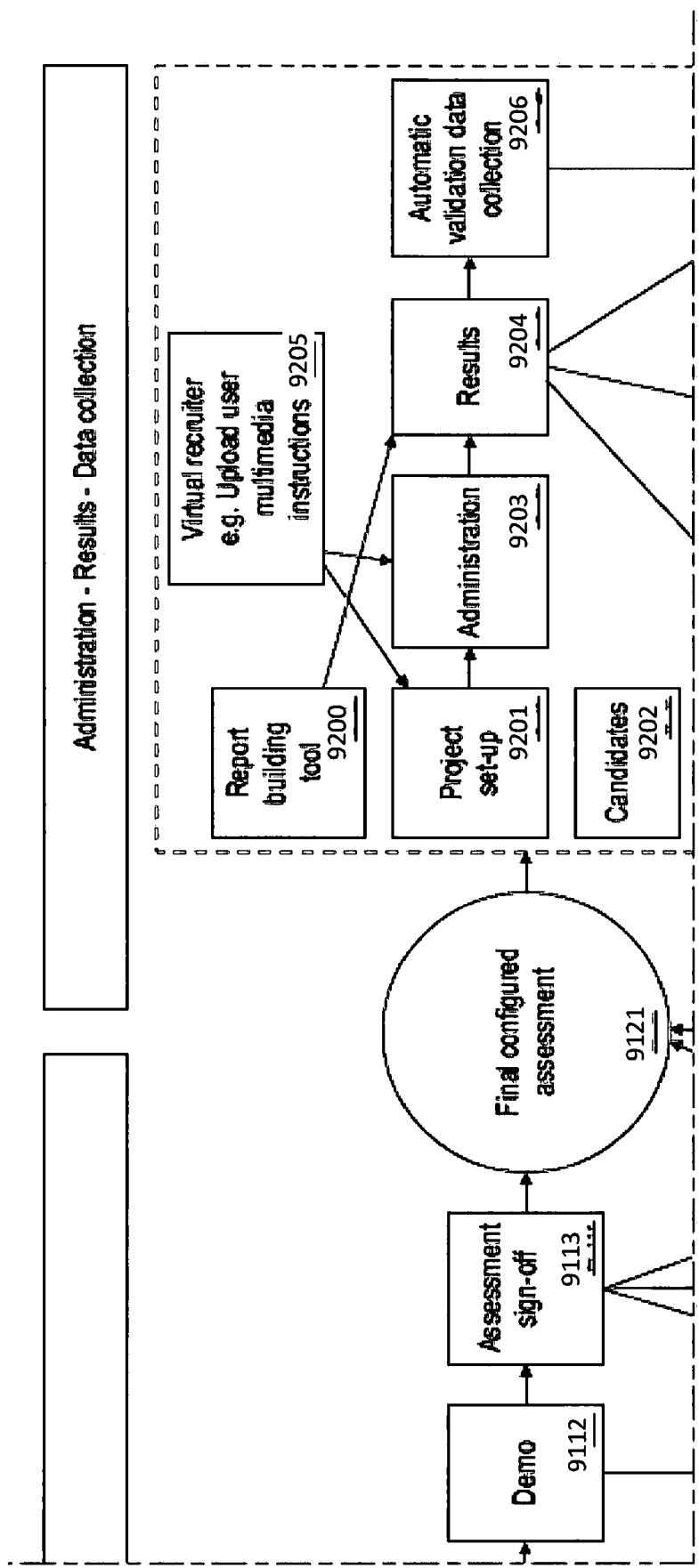
Figure 9D:
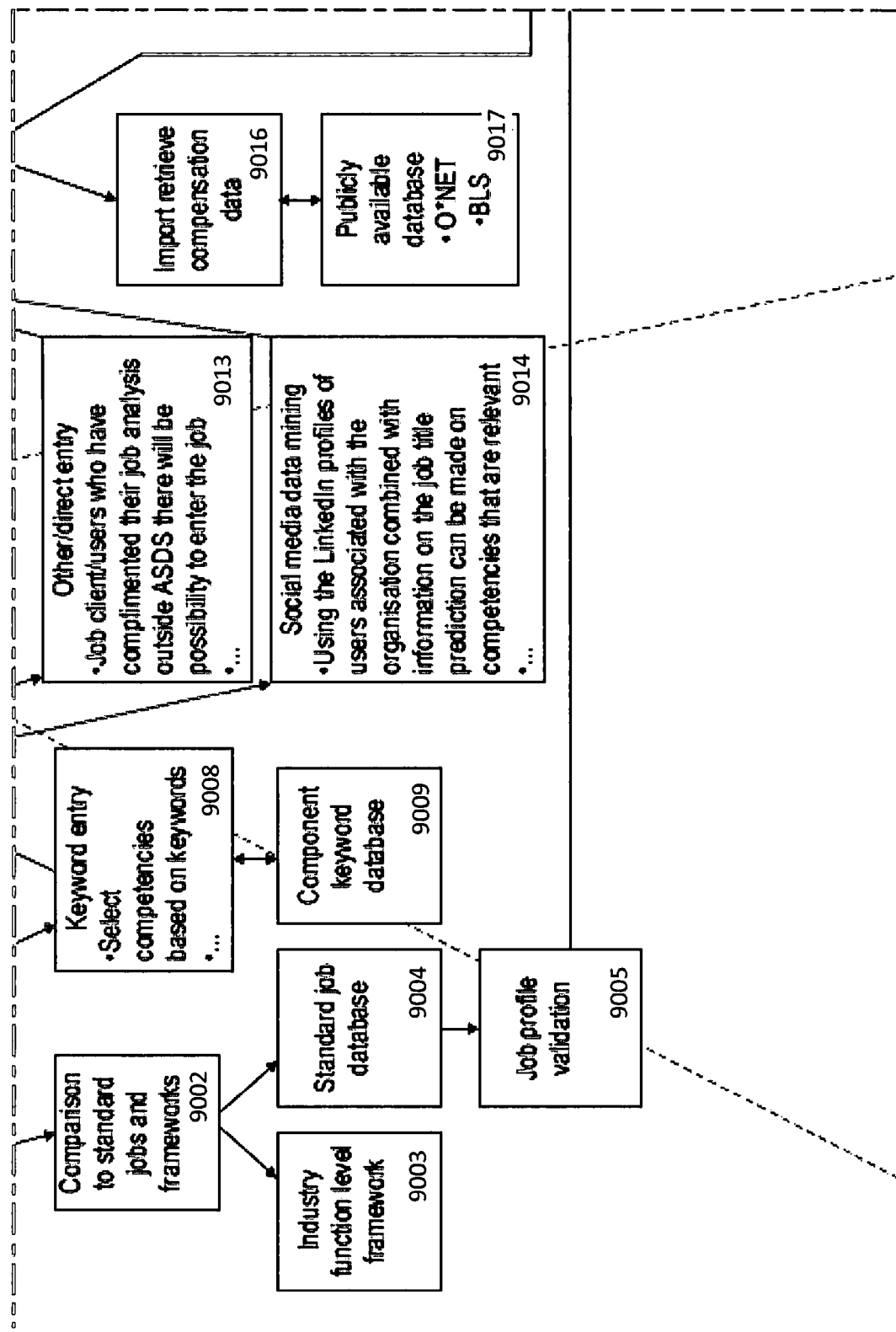
Figure 9E:
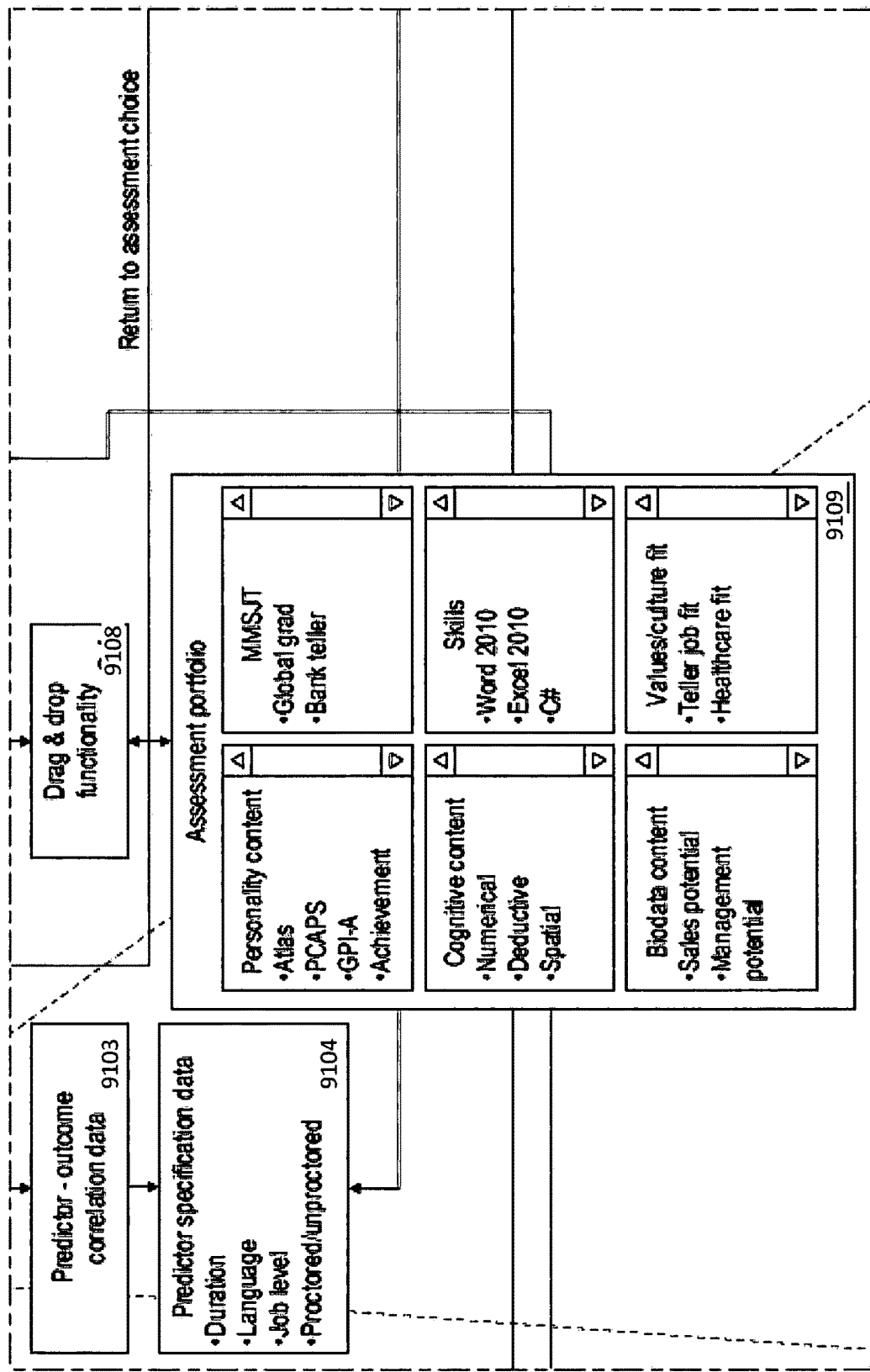
Figure 9F:
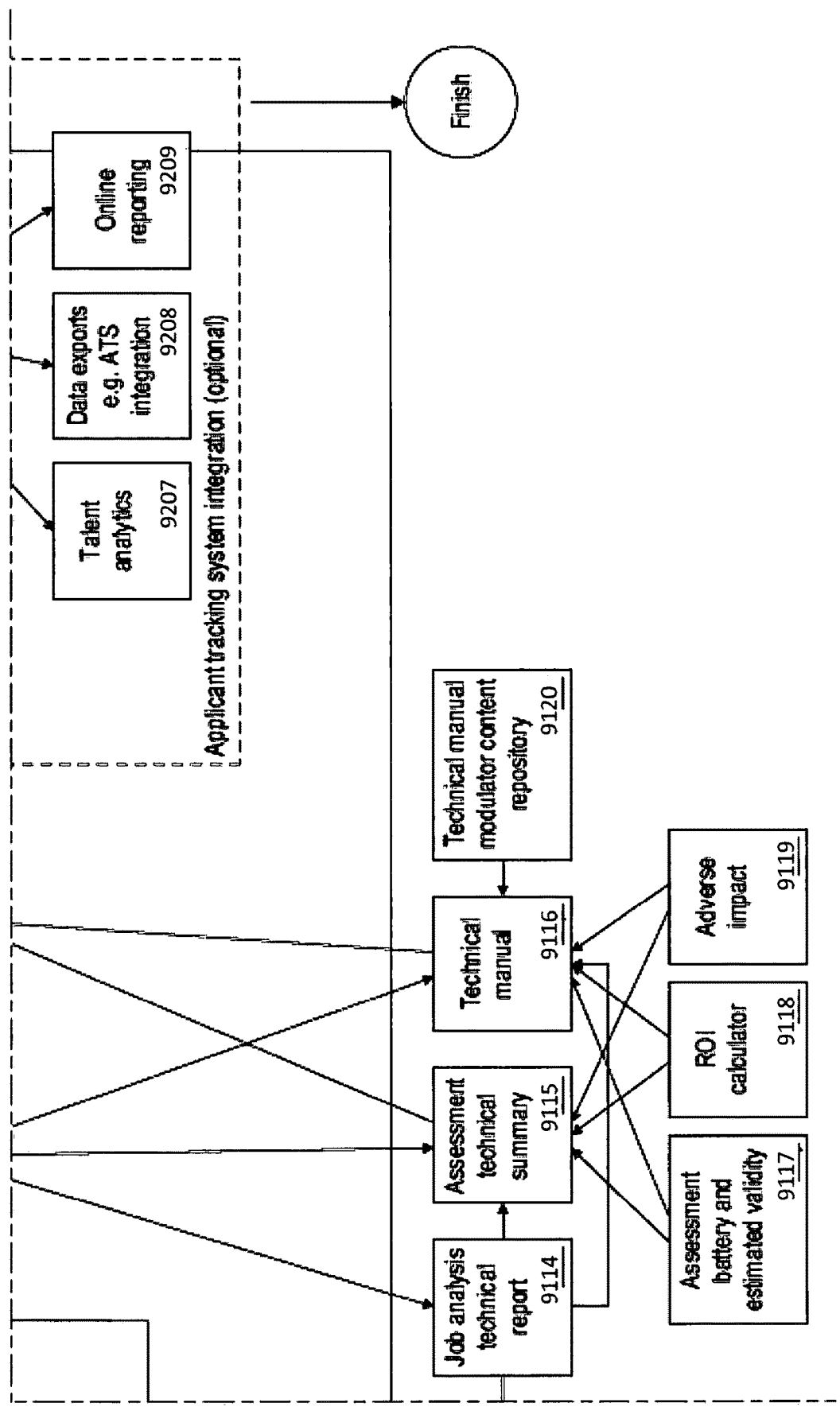
Figure 9G:
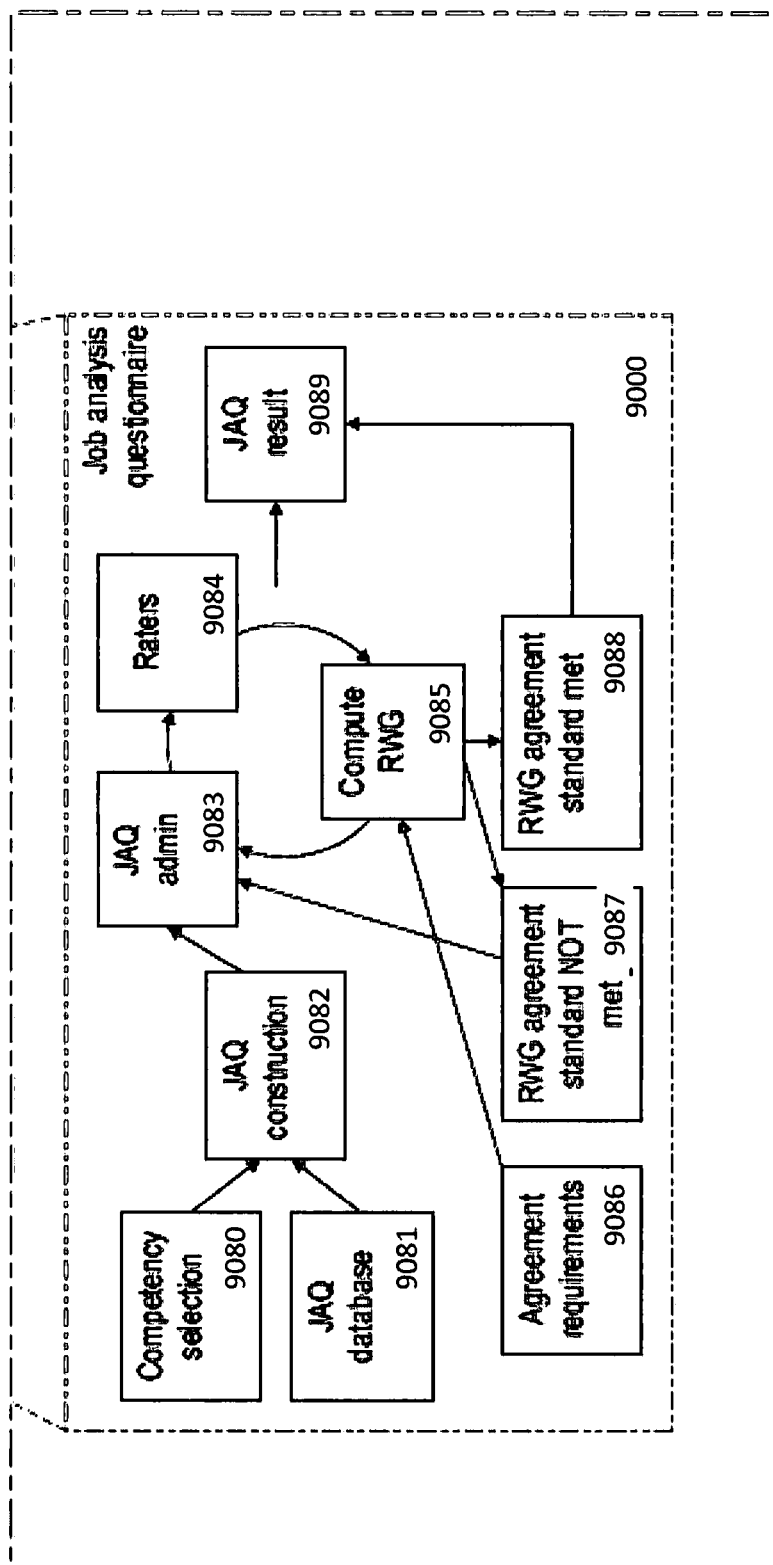
Figure 9H:
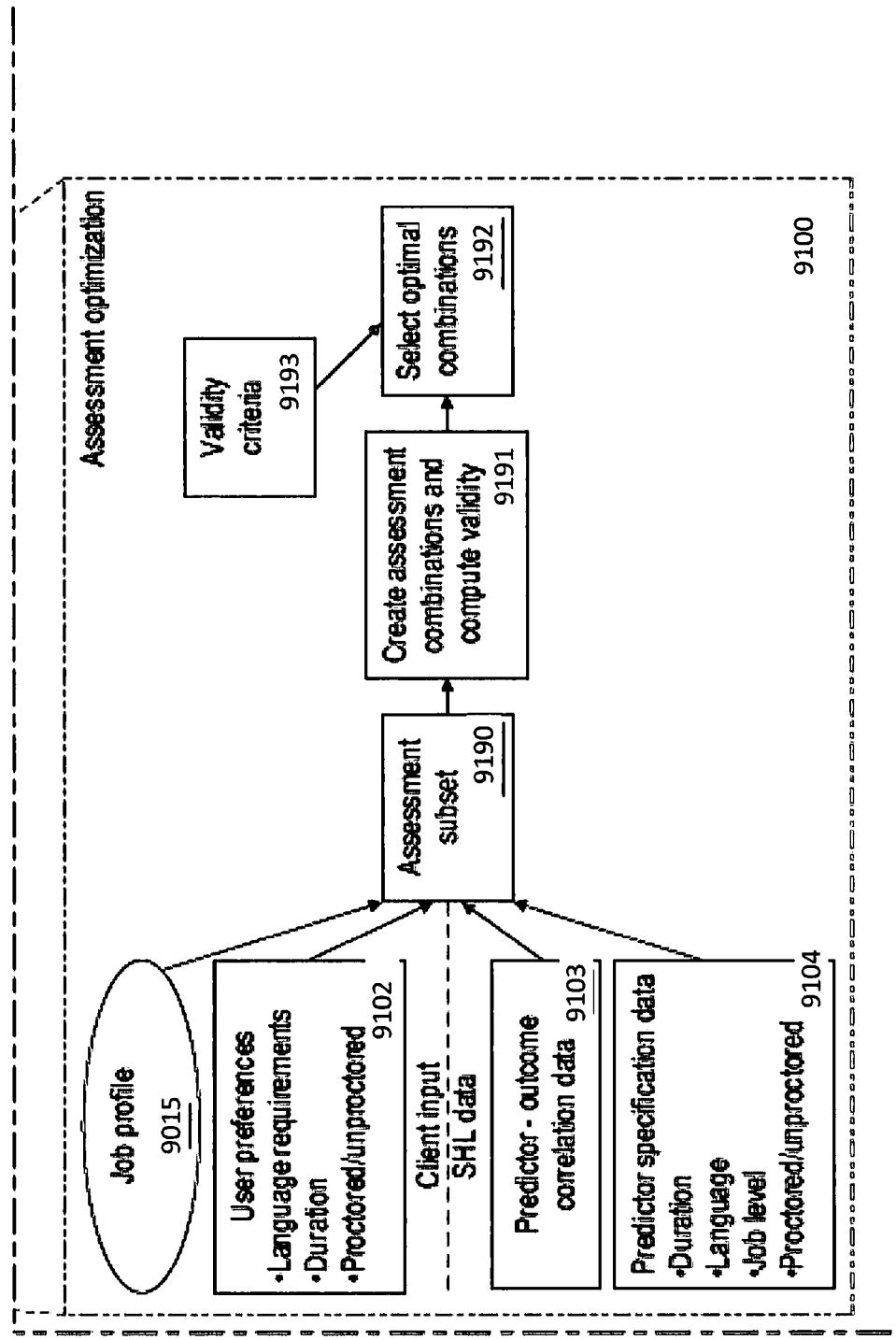

A more detailed flow diagram of the assessment system is shown in FIG. 9.

Figure 10:
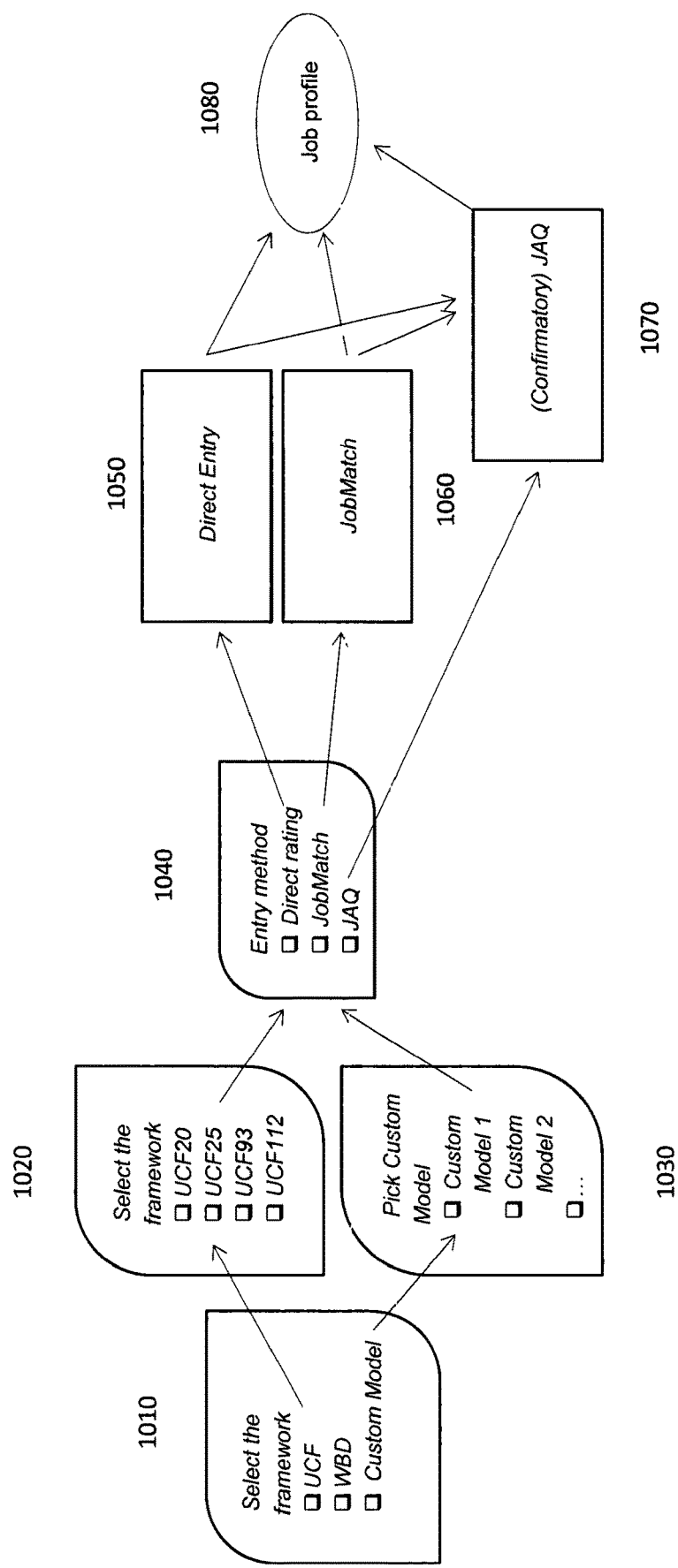
FIG. 10 shows a flow diagram of the job analysis phase.

FIG. 10 shows an overview of the job analysis phase. During this phase the user may perform the following actions:
   Select the framework 1010 within which the assessment will operate. This may be a pre-existing framework, such as UCF or WBD models 1020, or a custom model 1030
   Select the method by which they will enter data about the job 1040, for example by inputting the results of their own analysis directly 1050, by using JobMatch 1060, or by using JAQ
   Confirm the JobMatch or direct entry data by performing a confirmatory JAQ 1070
   Aggregate data obtained from multiple users that relates to the same job.

The data collected is then used to generate a job profile 1080, which consists of a list of competencies and an associated numerical rating of their importance to the job. If a large number of competencies are present, the job profile may comprise of only a selection of the most relevant. Optionally, the user is allowed to adjust the job profile if they disagree.

In further detail, the job analysis phase (section 1) includes the provision for multiple entry points when beginning the process of analysing a job or jobs. This ranges from entering a job title 9001, which triggers simultaneous searches of social media-based job information 9006, internal job databases and competency frameworks 9002, to other starting points based on method 9007, keywords 9008, or competency model preferences 9010, such as JobMatch 9012, Social Media Data Mining 9014 or other/Direct Entry methods 9013.

To elaborate, during a Comparison to Standard Jobs and Frameworks 9002, job titles are compared against a Standard Job Database or Databases 9004 which contain Job Profiles for common jobs. These jobs can be classified based on the IFL (Industry Function and Level) Framework 9003, which is used to locate standard Job Profiles. This framework is currently implemented by SHL TMS (Talent Management Solutions). Standard Job Databases 9004 contain jobs that are commonly assessed and have already been captured in SHL TMS databases. SHL TMS currently has standard assessment solutions for common jobs.

During a Social Media Job Title Search 9006, the Job Title 9001 entered by the user is compared to similar job titles available through various social media sites (professional networking, but also including job search/job posting sites and talent profile aggregators). Job titles similar to the current job are returned and possible alternative job titles are proposed. This allows the user to choose the Job Title that best reflects the position. Additional keywords associated with job titles gathered from social media sites will also contribute to the job competency specification 9014.

After entering the job title 9001 the user chooses their preferred method of Job Analysis in the Job Analysis Method Selection step 9007. The user is presented with best practice advice to guide them in their choice, enabling users with limited experience to make choices based on best practice. The possible options include: JobMatch 9012, Job Analysis Questionnaires (JAQ) 9011, Social Media Data Mining 9014, and Keyword Entry 9008. Users also have the option to enter a Job Profile directly 9013. This last method can be used when the Job Analysis has been done outside of the ASDS system.

Keyword Entry 9008 comprises the user entering keywords, which are then compared against the Component Keyword Database 9009. Based on the entered keywords, components are suggested. The Component Keyword Database contains keywords for each of the components in the Competency Framework and can be used to identify components based on keywords entered by the client.

Following Keyword Entry 9008, a Framework Selection 9010 is made. Based on the chosen Job Analysis method, the Competency Framework is chosen. In some cases the chosen Job Analysis method warrants the use of several frameworks. In these cases the user will be given the opportunity to choose. The user is presented with best practice advice to guide them in their choice, enabling users with limited experience to make choices based on best practice.

If the Job Analysis is based on the Job Title and the IFL framework, a standard Job Profile is identified and the user is asked to review the Job Profile to ensure the profile is in line with the user's expectation 9005. If the user is satisfied with the Job Profile they can continue directly to the Assessment Configuration stage 9110.

With inputs derived from these steps, a job analysis questionnaire (JAQ) 9011 can be created which can be administered to job experts within the user's organization via URL hyperlinks embedded within emails sent to them (9080-9089). Responses to the JAQ are captured by the system in a database that computes real-time statistics on the responses.

In further detail, based on the Competency Framework a job analysis questionnaire (JAQ) 9011 is created which can be administered to job experts within the user's organization via URL hyperlinks embedded within emails sent to them from the ASDS system (9080-9089). Responses to the JAQ are captured by the system in a database that computes real-time statistics 9085 from the responses. The system has the capacity to stop collecting data 9088 or to send out additional requests 9087 for more input based on pre-determined thresholds 9086 for minimum number of raters and achieving a minimum value on an inter-rater agreement statistic (e.g. Rwg). Once data is received, important means and standard deviations will be computed on the various competencies, tasks, context variables, and all other data input fields specified.

The Job Analysis Questionnaire box 9000 in FIG. 9 gives further detail about the JAQ phase of the process. Based on the Competency Framework 9080 a job analysis questionnaire (JAQ) is created by selecting relevant statements about the tasks, knowledge, skills, abilities, traits and other characteristics from the JAQ Database 9081. This database contains statements about the tasks, knowledge, skills, abilities, traits and other characteristics for all competencies. Based on the competencies chosen by the user 9080 and the task descriptions in the JAQ Database 9081 a Job Analysis Questionnaire is constructed 9082. The JAQ Admin 9083 then administers the JAQ to raters 9084. This function includes a user interface that allows the creation of the JAQ, specification of rater recipients, email addresses, and a dashboard to monitor the real-time status of responses, resend survey URLs, and manage the data collection process. The user distributes the JAQ to raters in order to complete the JAQ. The JAQ is administered to an initial set of raters and guided by best practice recommendations on the number and characteristics needed of the raters. Administrations are dependent on pre-determined thresholds 9086 for minimum number of raters and achieving a minimum value on an inter-rater agreement statistic (e.g. Rwg), 9085 to follow best practice guidelines and help achieve credible results. As JAQ's are completed by the initial set of raters, the Rwg inter-rater agreement statistic is computed and compared against the minimum standard. When both the minimum number of raters have responded and the Rwg value meets a pre-determined minimum standard 9086, a trigger is sent to the JAQ admin function 9083 to close data collection and compute final job profile statistics 9089.

Within the ASDS system a standard requirement for the agreement threshold will be set for the computed Rwg 9085 value. If, after the initial completion of JAQs by raters, the Rwg standard is not met 9087, the user is notified by email (or when logged into the system) that additional JAQs from additional raters are required. If additional JAQ results come in subsequently, the Rwg statistic is recomputed. This cycle repeats until either the Rwg standard has been met or a manual override is executed by the user if no further data options are available. Best practice guidelines would be provided to give the user additional options in this situation. Once the Rwg standard is met 9088, data collection is closed and no further inputs are accepted. The JAQ Results become available 9089 and are returned in the form of a Job Profile. Results are organized by competencies and standard statistics are computed.

Optionally, JobMatch 9012 can be used as an alternative to the aforementioned JAQ process 9011 whereby users select a job from a pre-defined database that translates job requirements into levels required on dimensions of job performance embodied by the Universal Competency Framework (UCF). Job Profiling by JobMatch is based on the O*Net Job Classifications and information about context variables. The information entered by the user is compared against a database which contains Job Profiles for a large number of Jobs. Data mining techniques are used to provide estimations of the most likely Job Profiles. Following the competency estimation, the user has the opportunity to do a confirmatory JAQ to check the results obtained by JobMatch. A patent application for this element of JobMatch is pending, International Patent Application No. PCT/GB2012/052419, entitled "Requirements characterisation", published as WO2013/045949.

Users also have the ability to directly enter their Job Profile 9013. This option would be used when the Job Analysis has been done outside of the ASDS system. This option is likely to be used by experienced Industrial or Organisational Psychologists who have experience conducting Job Analyses.

Social Media Data Mining 9014 can also be used. Using information about the user's company, the target job, and similar jobs gathered from social media sites (broadly defined as networking/communication sites, job search/post sites, and talent skill aggregators), predictions are made about which competencies are relevant for the job utilizing technology similar to that used in JobMatch 9012.

The net result of the Job Analysis stage is a Job Profile output 9015 which can be used by the process in section 2 (Assessment Configuration). In addition, the final job profile information from the Job Profile can be used to retrieve compensation data 9016 (among other details) from jobs in publicly available databases 9017 which can be further harnessed in step 2 to provide return on investment projections for the user. The Job Profile forms the basis of the next stage the Assessment Configuration. The Job Profile contains information about the Competency Framework that is being used, which competencies are selected, importance Ratings for those competencies, and numerous other context variables for the target job role(s).

At this stage the system may Import/Retrieve Compensation Data. Based on the Job Profile, compensation data is requested from publically available databases 9017. This information is presented to the client for reference and used in the Return on Investment calculation 9118 at the end of the Assessment Configuration, and is also used to estimate potential compensation values 9016 for the Job Profile 9015.

Figure 11:
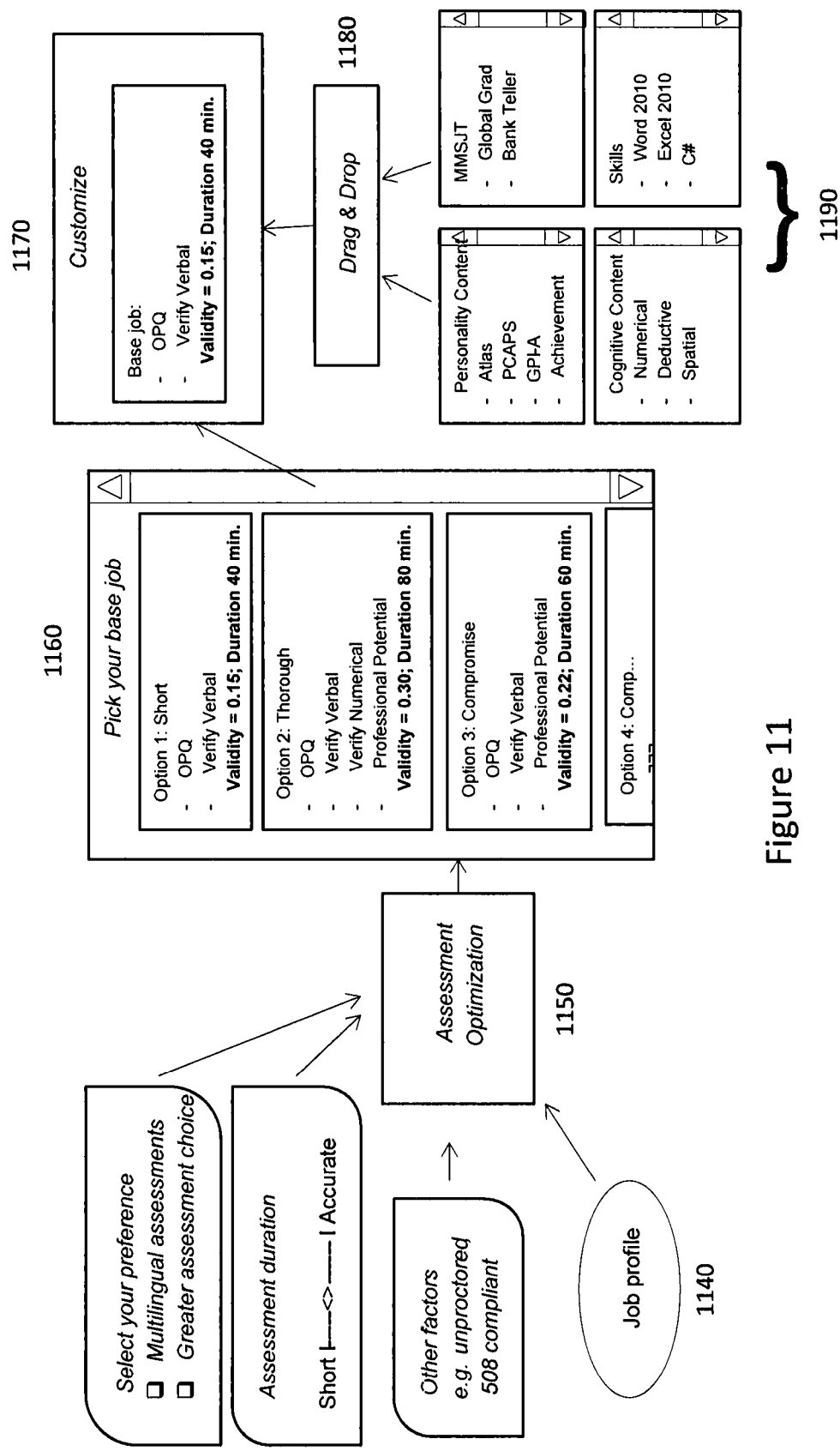
FIG. 11 shows a flow diagram of the first stage of the assessment configuration phase.

FIG. 11 shows an overview of the first stage of the assessment configuration. The user selects additional options relating to their requirements for the test, for example the language of the assessment 1110, the duration of the assessment 1120, whether the user wants a greater assessment choice, or regulatory requirements for the assessment 1130.

These choices are combined with the job profile 1140 to produce a list of 'base jobs' 1160 comprising different combinations of tests that meet the user's requirements. The list is compiled by generating all possible combinations of individual tests that satisfy the requirements, calculating their validity and choosing, based on their validity, a subset of the combinations to present to the user. The validity may be taken from a database of known assessment combinations or calculated using a synthetic norm. Base jobs in the list may be accompanied by statistical data relating to their validity, such as the validity for each of the competencies tested by the base job.

After selecting which base job to use, the user can then further customise the assessment 1170, for example by adding, through a drag and drop mechanism in a graphical UI 1180, additional tests 1190 into the selected base job, or by removing tests from the assessment using the same method. Additional tests offered to the user at this stage may include industry or skill specific tests, personality tests (such as Atlas, PCAPS or GPI-A), or cognitive tests. The duration and validity data of the assessment is updated automatically and presented to the user in real time.

In further detail, information from the Job Profile output 9015 is fed into the Assessment Optimization engine 9101, Job Analysis Technical Report writer 9114, and Assessment Technical Summary 9115. The assessment optimization engine 9101 requests additional input from the user and, combined with the output from the Job Profile, runs algorithms which look at information stored in databases to return the best assessment solution options for the user.

The additional input includes User Preferences 9102. The user is asked to enter preferences with regards to language requirements, duration, IFL parameters, and whether the assessment needs to happen in a proctored or unproctored setting. Additional other attributes for the entire assessment and/or individual components of the assessment that are known and stored would be available for users to select in order to further narrow down options. These requirements feed into the Assessment Optimization process 9101.

Given the large number of tests available with known properties and all other input criteria, tens of thousands up to millions of permutations are possible. The optimization engine compares all permutations and returns those that meet predefined design criteria and also account for user-specified inputs (reference output and sample code from "R" statistical software). The optimization engine is flexible in its methods, depending on input constraints, to return predefined solutions with known properties and connections to job profiles from section 1, or use synthetic validation techniques to create a new customized solution that represents a unique synthesis optimized for the specific user-defined inputs 9102 (FIGS. 3 and 5). For example, the assessment may be required to have a high mean validity and low standard deviation. After calculating theses quantities for all possible test combinations lying within the defined duration and language constraints 9190, only those with results 9192 that lie within the desirable range 9193 are presented to the user.

Figure 12:
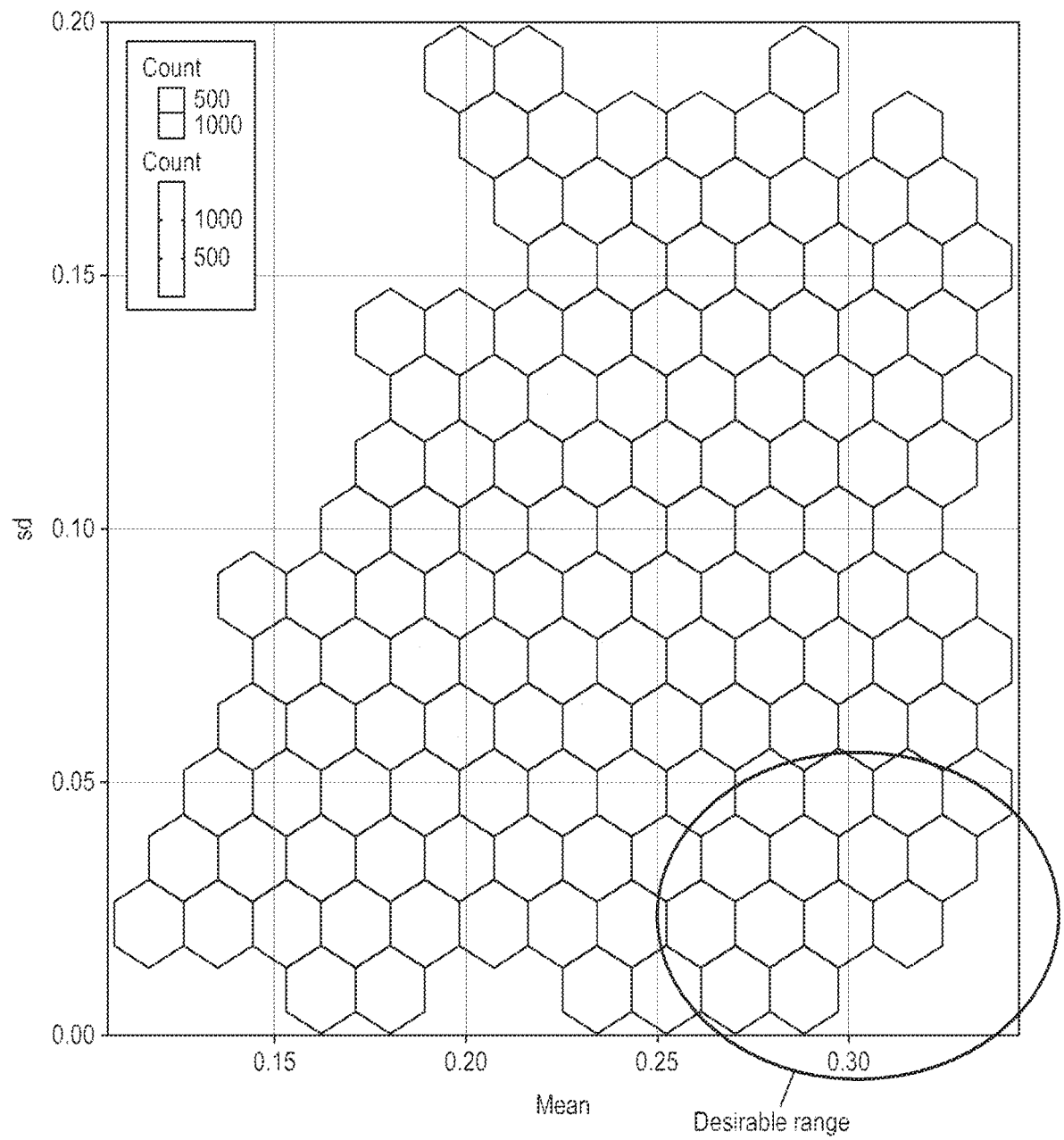
FIG. 12 shows a distribution of the mean validity and standard deviation for a set of potential assessment combinations.

FIG. 12 shows an example of this, namely the distribution of test combinations across a range of mean validities and standard deviations. The desirable range for this example is indicated in the figure by a red oval.

Further details of the Assessment Optimisation 9101 process can be seen in the Assessment Optimisation box 9100 of FIG. 9. The Job Profile 9015 is combined with User Preferences 9102, information about predictors 9104 and validation information 9103. Based on user preference, optimised assessment combinations are presented. For each assessment combination relevant figures (such as overall validity, validity coefficients by component, adverse impact measures, and duration) are computed. The suggested solutions and the relevant figures are updated in real-time as the user changes their preferences. Having access to this information in real-time gives the user unique decision power to select the optimal combination of assessments. An advantage of ASDS is that it simultaneously compares all outcome possibilities (typically a very large number) based on input variables specified by the user (including from the job profile), resulting in the rank-ordering of best solutions. Based on the number of competencies and other input variables, anywhere from thousands to millions of permutations are examined to produce the best "fit" options based on user specifications that previously would have required expert judgment to produce and much time. In addition, should the system not be able to dynamically determine an assessment combination that meets all user requirements, it will suggest options including standard pre-configured solutions that match the job profile, and/or direct users to review the requirements parameters, or a consultant for further expert advice.

To achieve the Assessment Optimisation, an Assessment Subset 9190 is produced. Information from the Job Profile 9015 and its unique identification number in the database, User Preferences 9102, Predictor Outcome Correlation Data 9103, and the Predictor Specification Data 9104 are combined to select a subset of potential assessments. For example, only those assessments that meet the language, duration, IFL parameters, proctoring requirements, and have predictive validity on the components being measured are included. The next step of the Assessment Optimisation is to create Assessment combinations and compute their validity. Using the Assessment Subset, 9190 individual assessment components are combined into all relevant and available permutations that meet user-supplied specifications 9102. For each combination, synthetic validities are computed for each of the components, as well as the overall validity generated 9191 by the unique combination of individual components. From this Optimal Combinations are selected 9192. Assessment combinations which meet the Validity Criteria 9193 are presented to the user and rank-ordered (e.g. top 5). The validity criteria would typically take the form of minimum standards of criterion-related validity, and any other relevant information to support content or broader construct validity requirements.

The Predictor Outcome Correlation Data 9103 used in the Assessment Optimisation is generated from correlations between predictors and outcomes (competency components), and are used to estimate the validity of potential assessment combinations in the Assessment Optimization process 9101. SHL TMS has over 1,000 unique assessments in its active portfolio, which enhances the ability to create custom combinations of assessments using more granular filtering and selection criteria. Predictor Specification Data contains information about predictors, which are used in combination with the User Preferences 9102 to identify a subset of assessments that could be used 9190 in the optimisation process. There are a variety of known properties stored for each individual assessment which can used to filter, combine, and synthesize accurate assessment combinations that best meet user requirements.

Figure 13:
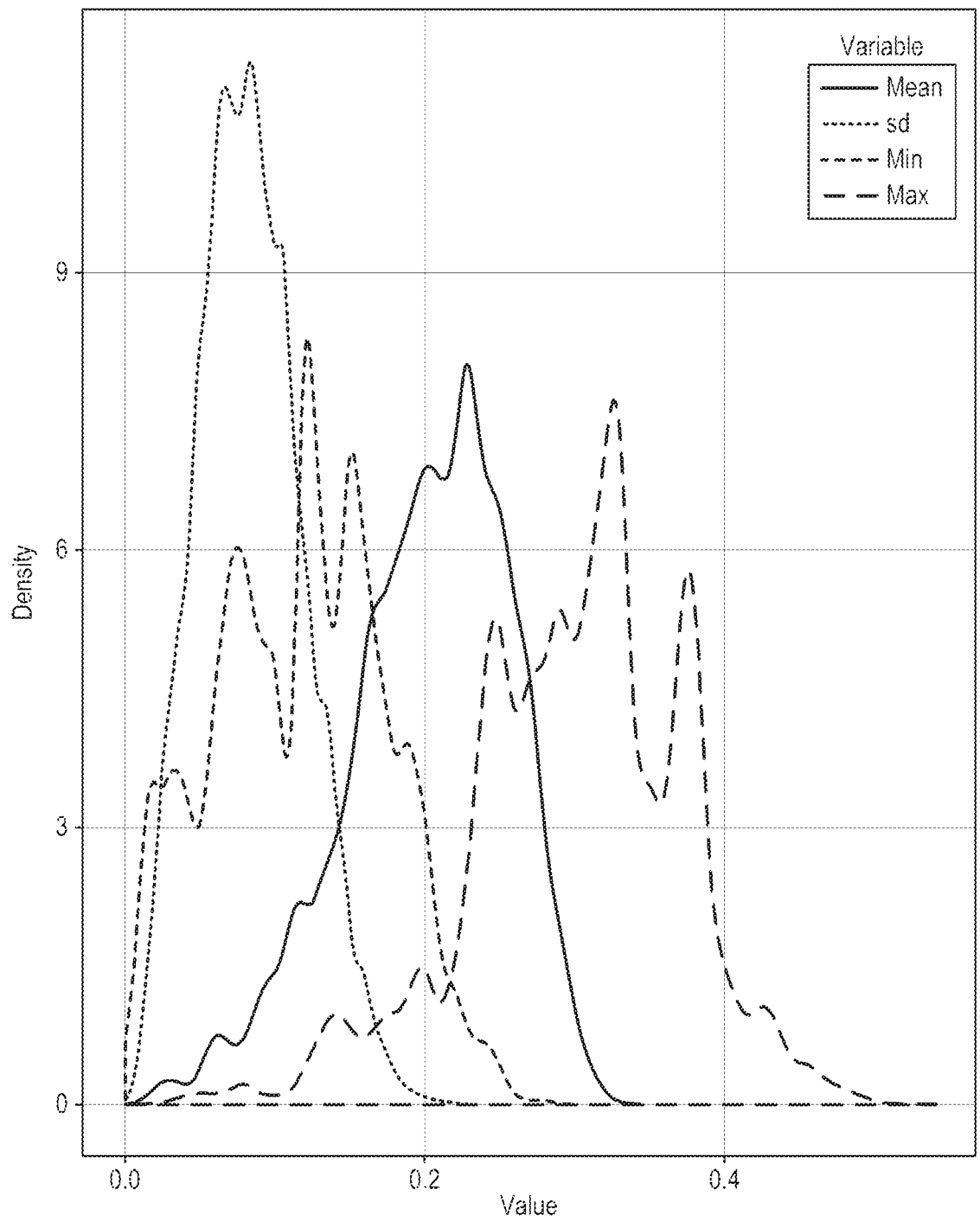
FIG. 13 shows example distributions of base job statistics calculated during the assessment optimisation.

The optimisation engine also calculates the predicted validity for a selection of competencies for each of the test combinations considered. Distributions of the test combination validities can then be calculated, which can be stored for use in producing the technical reports for the assessment. Examples of such distributions are shown in FIG. 13.

Figure 14:
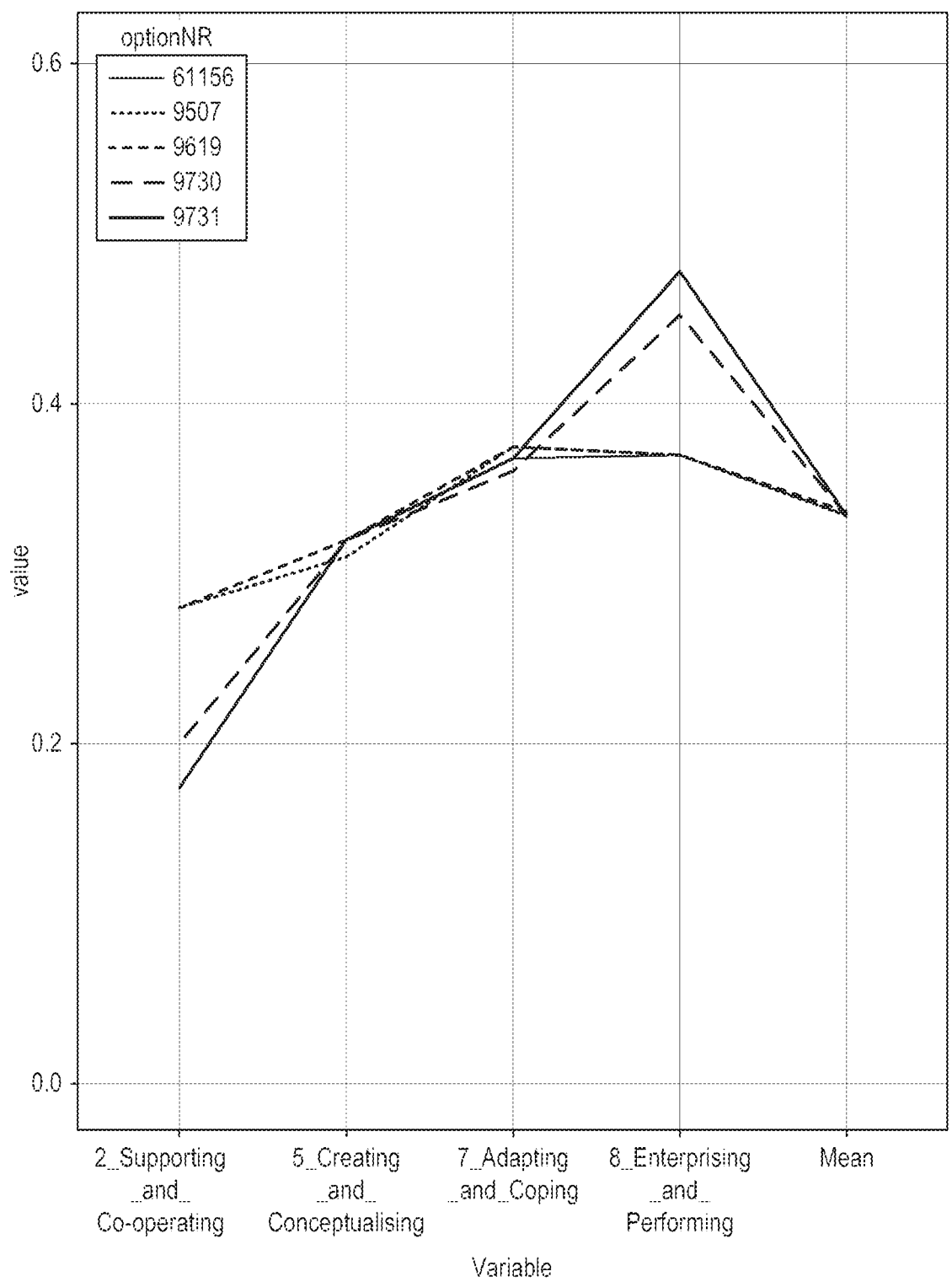
FIG. 14 shows an example of a validity by competency graph.

FIG. 14 shows an example of the validity for four different competencies of five different solutions that have the same mean validity. Conditions on the validity for specific competencies can be used to further filter the solutions, for example by the specifying a minimum validity for each competency.

Example code (written in 'R') for the optimal choosing of assessment combinations based on a large pool of available options as described above is as follows:

```
>   ##########################################
>   ### ASSESSMENT SELECTION OPTIMISATION ###
>   ##########################################
>
>   library(utils)
>   library(ggplot2)
>   library(reshape2)
>   library(hexbin)
>
>   ##########################
>   ### LOAD CORRERATIONS ###
>   ##########################
>   # Correlations between 73 predictors and 8 components
>   corData <- read.csv("corData.csv", header=TRUE)
>   row.names(corData) <- corData[,1]
>   corData <- corData[,-1]
>   corFullPred <- corData[-c(1:8),]
>   corFullPredOut <- corData[1:8,]
>
>   ####################
>   ### USER INPUT ###
>   ####################
>
>   # User selects a subset of components to measure
>   compNrs <- c(2,5,7,8) # In this case the competencies 2, 5, 7 and 8 are chosen
>   compLabels <- row.names(corFullPredOut)[compNrs]
>   compLabels
[1] "2_Supporting_and_Co-operating"     "Comp2" "7_Adapting_and_Coping"      "Comp4"
>
>   # User select how many tests to use
>   nrOfTests <- 3
>
>   # Loop through options
>   combinations <- t(combn(row.names(corFullPred),nrOfTests))
>   combinations <- as.data.frame(combinations, stringsAsFactors =false)
>   head(combinations)
            V1                V2            V3
1    Test1            Test2
2    Test1            Test3
3    Test1    Test4
4    Test1    Test5
5    Test1            Test6
6    Test1            Test7
>   nrow(combinations)
[1] 62196
>
>   GetVals <- function(compLabels, predLabels) {
+       predLabels <- na.omit(as.character(precLabels))
+       predLabels <- unlist(predLabels)
+       # print(predLabels)
+       corPredOut <- as.matrix(corFullPredOut[compLabels,predLabels])
+       corPred <- as.matrix(corFullPred[predLabels, predLabels])
+       synthVal <- rowMeans(corPredOut) / sqrt(mean(corPred))
+       return(synthVal)
+   }
```

```
>
>   GetBestVals <- function(compLabels, predLabels) {
+       subComb <- matrix(nrow=length(predLabels))
+       for (i in 1:length(predLabels)) {
+           predLabels <- as.character(predLabels)
+           combToAdd <- combn(predLabels,i)
+           naMatrix <- matrix(NA,nrow=length(predLabels)-i,ncol=ncol(combToAdd))
+           combToAdd <- rbind(combToAdd,naMatrix)
+           subComb <- cbind(subComb, combToAdd)
+       }
+       subCombData <- as.data.frame(t(subComb),stringsAsFactors=FALSE)
+
+       bestVals <- t(apply(subCombData,1,GetVals,compLabels=compLabels))
+       bestVals <- as.data.frame(bestVals)
+       names(bestVals) <- compLabels
+       bestVals <- apply(na.omit(bestVals),2,max)
+       return(bestVals)
+   }
>
>   vals <- apply(combinations,1,GetBestVals, compLabels=compLabels)
>   combinations <- cbind(combinations,t(vals))
>   head(combinations)
            V1              V2          V3   Comp1    Comp2
1   Test1           Test2           0.02             0.1200000
2   Test1           Test3           0.14             0.1200000
3   Test1   Test4                   0.07     0.0600000
4   Test1   Test5                   0.19     0.0700000
5   Test1           Test6           0.01             0.2500000
6   Test1           Test7                            0.00
0.0146385
    Comp3   Comp4
1           0.02    0.09
2           0.29    0.37
3           0.21    0.24
4           0.08    0.10
5           0.03    0.05
6           0.00    0.01
>
>   # Add summary statistics
>   GetSumStats <- function(data) {
+       mean <- mean(data)
+       sd <- sd(data)
+       min <- min(data)
+       max <- max(data)
+       es <- mean/sd
+       return(c(mean,sd,min,max,es))
+   }
>
>   sumStats <- as.data.frame(t(apply(combinations[,compLabels],1,GetSumStats)))
>   names(sumStats) <- c("mean","sd","min","max","es")
>   combinations <- cbind(combinations,sumStats)
>   head(combinations)
            V1              V2          V3   Comp1    Comp2
1   Test1           Test2           0.02             0.1200000
2   Test1           Test3           0.14             0.1200000
3   Test1   Test4                   0.07     0.0600000
4   Test1   Test5                   0.19     0.0700000
5   Test1           Test6           0.01             0.2500000
6   Test1           Test7                            0.00
0.0146385
    Comp3   Comp4       mean            sd              min     max         es
1   0.02    0.09    0.062500000     0.050579970     0.02    0.1200000   1.2356670
2   0.29    0.37    0.230000000     0.120277457     0.12    0.3700000   1.9122453
3   0.21    0.24    0.145000000     0.093273791     0.06    0.2400000   1.5545632
4   0.08    0.10    0.110000000     0.054772256     0.07    0.1900000   2.0083160
5   0.03    0.05    0.085000000     0.111205515     0.01    0.2500000   0.7643506
6   0.00    0.01    0.006159625     0.007360294     0.00    0.0146385   0.8368722
>
>   # Explor sumStats in plot
>   # Figure R-1 Summary statistics
>       # This plot show the distrubtion of the summary statistics for all possible
combinations
>   ggData <- melt(sumStats[,-5])
No id variables; using all as measure variables
>   head(ggData)
    variable        value
1       mean    0.062500000
2       mean    0.230000000
3       mean    0.145000000
```

```
4              mean  0.110000000
5              mean  0.085000000
6              mean  0.006159625
>   ggplot(ggData, aes(x=value, group=variable, color=variable)) + geom_density( )
>
>   # Assement selection
>   nrow(combinations)
[1] 62196
>   minMin <- 0.1
>   options <- combinations[combinations[,"min"]>=minMin,]
>   optionNr <- row.names(options)
>   options <- cbind(options,optionNr)
>   nrow(options)
[1] 37924
>   # Mean SD Plot
>   # Figure R-2 Mean and SD
>    # This plot show the distribution of mean and standard deviation of assessment
combinations.
>   ggData <- options[,c("mean","sd","optionNr")]   #, id.vars="optionNr")
>   head(ggData)
        mean          sd  optionNr
2      0.2300   0.12027746        2
16     0.1800   0.06055301       16
32     0.1925   0.06551081       32
34     0.1625   0.03774917       34
40     0.1675   0.03593976       40
50     0.1850   0.06027714       50
>   ggplot(ggData,aes(x=mean, y=sd))+stat_binhex (bins=12, aes(alpha = ..count..))
>
>   # Se
>   options <- options[order(options[,"mean"], decreasing=TRUE),][1:5,]
>   options
                    V1            V2           V3    Comp1    Comp2
9619     Test3    Test10   Test11   0.2800000           0.32
9731     Test3    Test11            Test12                         0.1742843
0.32
61156             Test10   Test11            Test12                0.2800000
0.32
9507     Test3    Test13            Test10                         0.2800000
0.31
9730     Test3    Test11            Test14                         0.2001041
0.32
      Comp3     Comp4      mean         sd         min        max        es  optionNr
9619  0.3743884 0.3700000  0.3360971  0.04480190  0.2800000  0.3743884  7.501849  9619
9731  0.3679334 0.4776679  0.3349714  0.12582170  0.1742843  0.4776679  2.662270  9731
61156 0.3679334 0.3700000  0.3344834  0.04304471  0.2800000  0.3700000  7.770602  61156
9507  0.3743884 0.3700000  0.3335971  0.04625499  0.2800000  0.3743884  7.212132  9507
9730  0.3614784 0.4518481  0.3333577  0.10450786  0.2001041  0.4518481  3.189785  9730
>
>   # Validity plot
>   # Figure R-3 Validity by component
>   # This plot show the validities by component
>   ggData <- melt(options[,c(compLabels,"optionNr")], id.vars="optionNr")
>     ggplot(ggData, aes(x=variable, y=value, group=optionNr, colour=optionNr)) +
geom_line( ) + scale_y_continuous(limits = c(0, 0.6))
```

As an additional step, the user is able to further customize the solution if the solution options generated by the optimization engine require changes. Such changes might take the form of best practice recommendations that are offered dynamically based on characteristics of the base job solution 9105. An example of this interface 9101-9110 is presented in FIG. 15 and FIG. 16.

Figure 15:
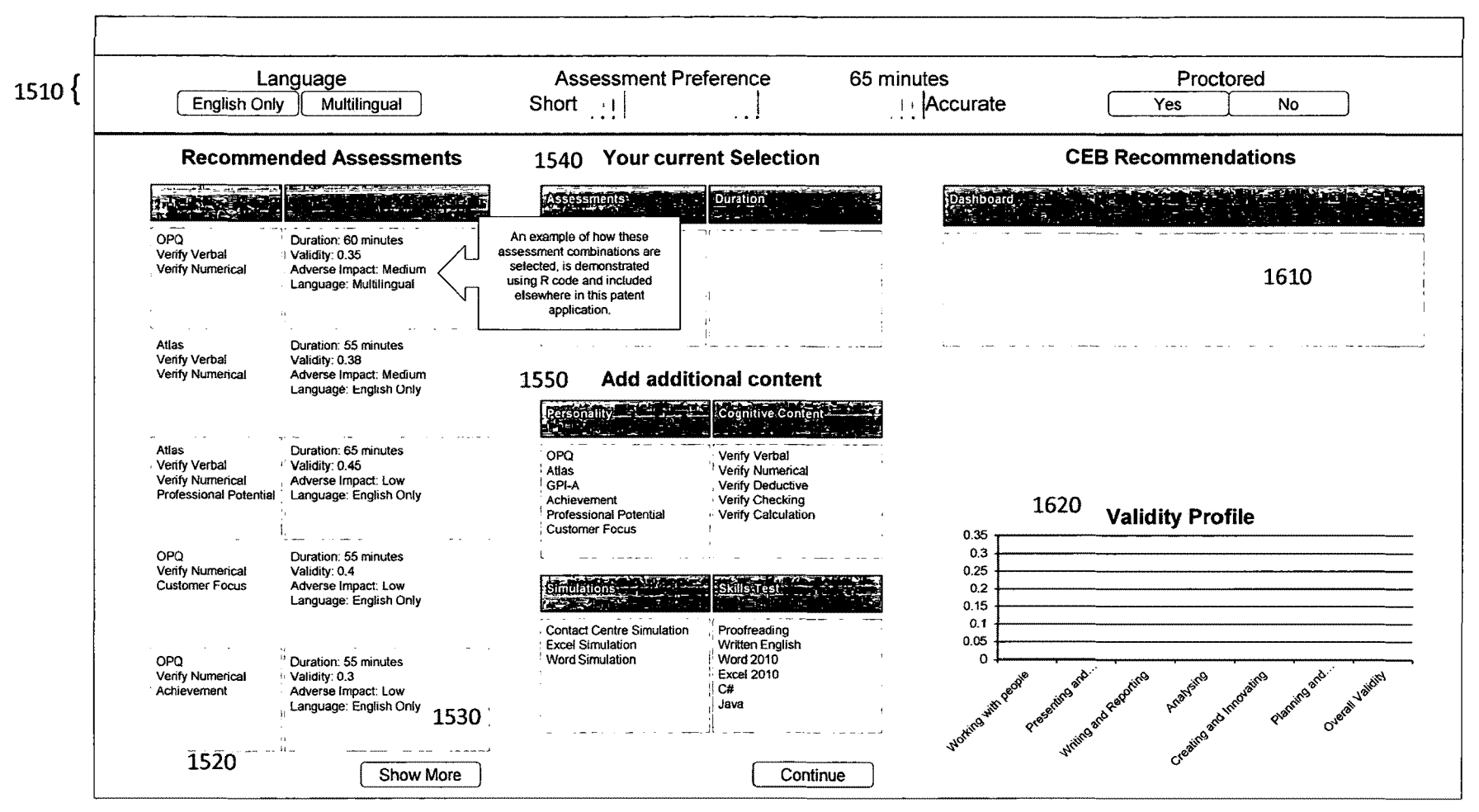

FIG. 15 shows an example of a GUI used in the assessment configuration phase of process, before the assessment has been customised by the user. The language and duration preferences are set in the upper menu bar 1510. Once the proceed button is pressed, base jobs consistent with the user preferences (Recommended Assessments 1520) are displayed, along with data 1530 about their validity, duration, language and adverse impacts. After selecting a base job from this list, it will appear in the current selection area 1540. Additional tests from the 'Add additional content' 1550 area may then be added to the base job.

Figure 16:
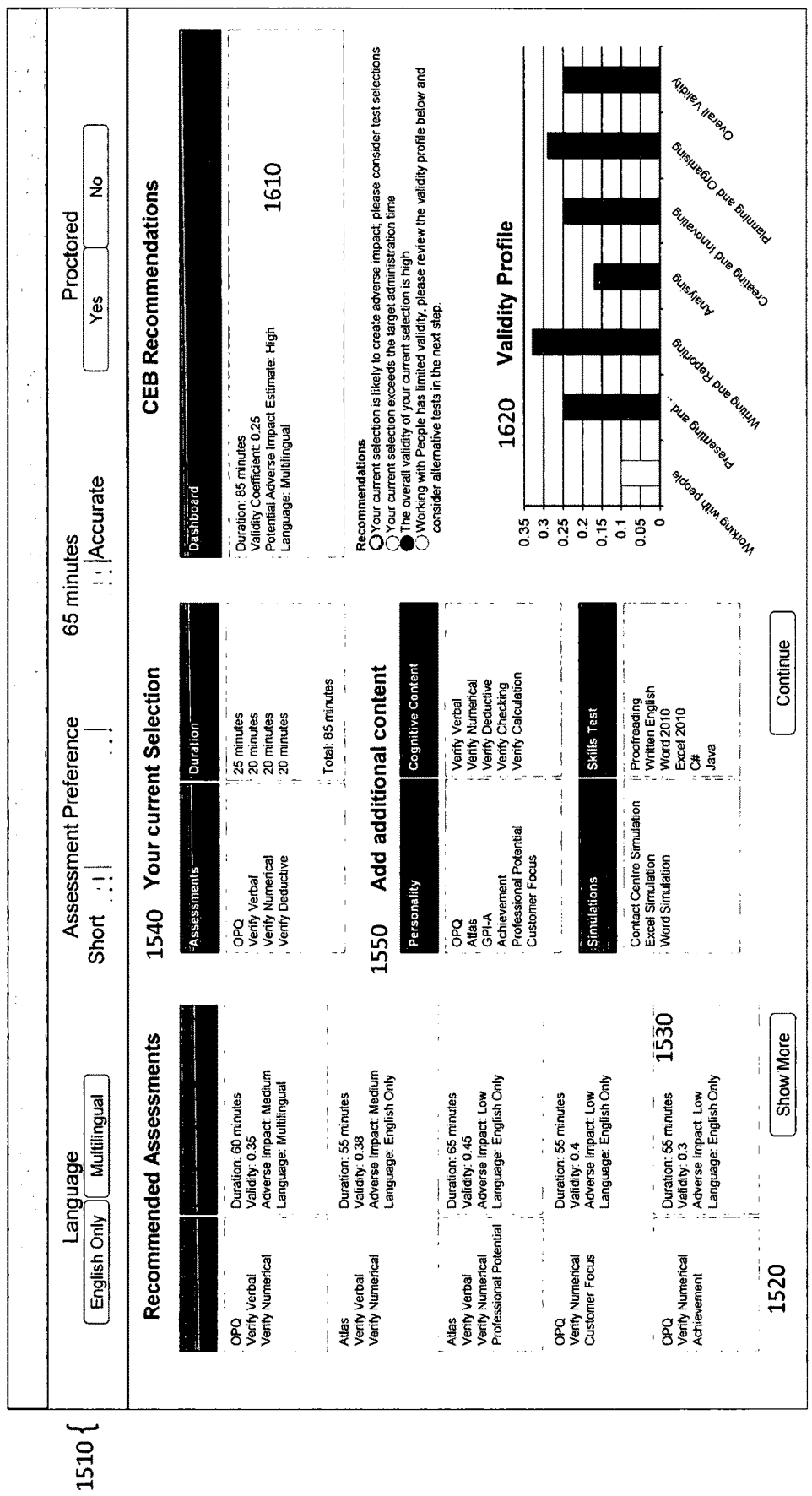
FIG. 16 shows a further example of a GUI used in the assessment configuration phase of the assessment construction process.

FIG. 16 shows an example of a GUI used in the assessment configuration phase of the process, after/during the customisation of the assessment by the user. As additional tests are added to the base job, the data relating to the validity, duration, language and adverse impacts are updated in real time in the dashboard area 1610. A validity profile 1620, showing the estimated validity of the customised assessment for a selection of competencies, is also updated in real time.

In further detail, the user selects a base job from a list of optimized assessment combinations 9192. This, in practice, results in a rank-ordered display of a smaller subset of assessment combinations that best meet user requirements. The user then has the option to customize this combination further in the Assessment Content Customization stage 9106. Following the selection of the base job 9105, the user has the option to remove content or add content from the Assessment Portfolio 9109, for example by using Drag &

Drop Functionality 9108. Drag and Drop functionality enhances the user experience by allowing the easy addition or removal of content and key design parameter variables through a simple graphical interface with the ASDS system. The user is presented with best practice advice at each step, enabling a user with limited experience to make choices based on best practices 9107. Recommendations are provided based on best practice guidelines and legacy user data. As legacy data continues to accumulate, periodic database maintenance will be performed to keep system linkages and connections up-to-date. Best practice recommendations will address topics such as validity/accuracy, reliability, expected performance of different demographic groups (e.g adverse impact), overall assessment duration, and test security considerations, among others. As choices are made, all output variables will be computed and updated in real-time so the user can model and compare options and view the impact of changes to their initial selections.

Once the base job has been selected the user can add content from the entire Assessment Portfolio 9109 to customize the assessment further. Synthetic validity techniques will be used to update data in real-time as the user makes changes, or pre-configured solutions can also be recommended in cases where the system has too many constraints to produce a dynamically-generated assessment option. Using this functionality the user is allowed to add an additional test that may not have been part of the optimal assessment options offered initially, yet ones which still meet minimum standards and could enhance the overall final assessment through criteria that may not have been captured previously.

The first part of the Assessment Configuration stage results in a list of selected assessments 9110. Next the client has the option to customize the candidate experience further 9111 and to go through a demo 9112.

Figure 17:
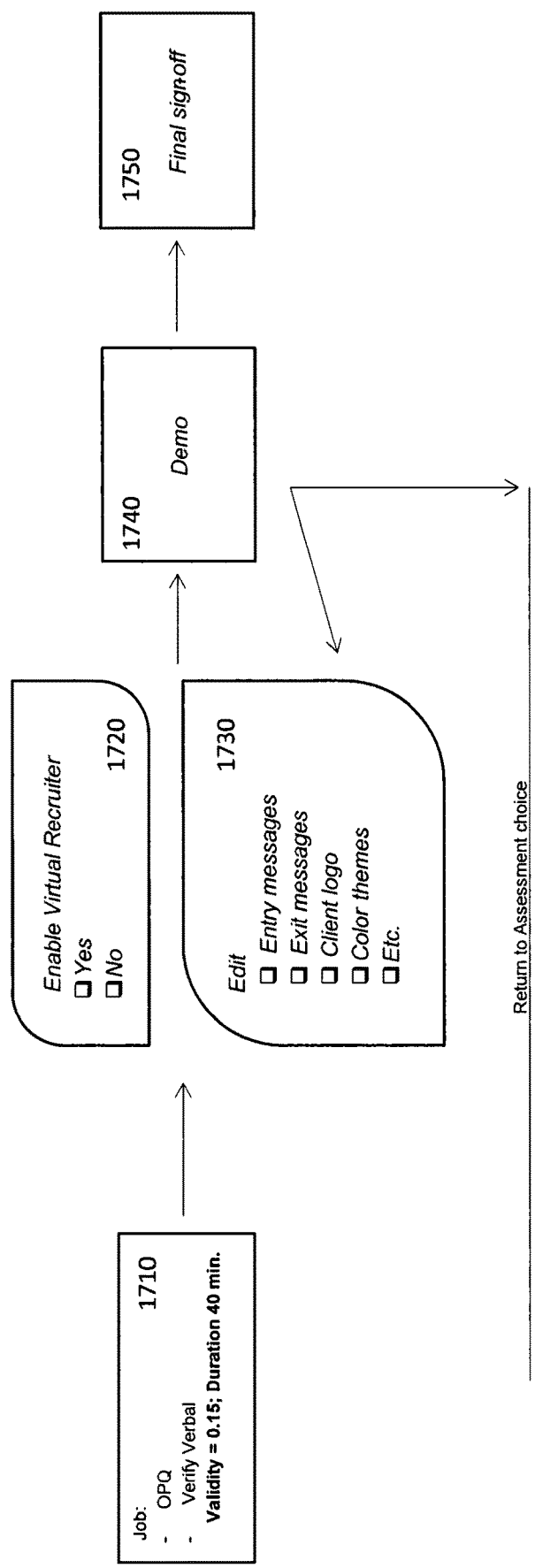
FIG. 17 shows a flow diagram of the second stage of the assessment configuration phase.

FIG. 17 shows an overview of the second stage of the assessment configuration. After the user has customised the battery of tests that make up the assessment to his satisfaction, further options 1730 relating to the assessment are chosen, such as entry and exit messages, colour schemes, or logos. The option to include a virtual recruiter 1720, who will guide assessment candidates through the assessment, may also be present. The user then undergoes a demonstration 1740 of the assessment solution, which may lead to further customisation of the assessment if the user is unsatisfied. If the user is satisfied, they may sign off 1750 on the assessment, at which point a technical report is automatically generated.

To elaborate further, once the assessments (solution) have been chosen, additional elements of the administration can be further customized via the virtual recruiter tool 9111. This allows the user or administrator of the chosen solution to refine the test-taker user experience with additional elements to contextualize, brand, inform/educate, provide realistic job previews, etc. In this customization step the client has the option to enable the virtual recruiter with standard or customized multimedia materials, modify the assessment appearance, upload and incorporate branding materials, adjust colour schemes, and change entry/exit messages.

Once all elements of the administration have been chosen, a brief demonstration of the final package 9112 is viewable to the user before final confirmation 9113. Before the Assessment Sign-Off 9113, the client is prompted to go through a demo that allows the user to experience the assessment as if they were the candidate going through the assessment. The user can choose to go through the full assessment or a shortened version of each test. Following the Demo the client has the opportunity the return to the Assessment Selection stage if further changes are desired. Any changes needed at this stage refer the user back to the interface associated with the selection of base job 9105 and any additional changes can be made again.

When the user is satisfied with their choices, they finalise the assessment configuration which then triggers some automated documentation creation supporting the exact configuration chosen. Following this step a number of reports are generated. These are: the Job Analysis Technical Report 9114, the Assessment Technical Summary 9115, and the Technical Manual 9116. Upon final assessment sign-off 9113, a brief technical assessment summary 9115 will be produced with modular content of the technical details corresponding to the job, assessment content, expected validity 9117, adverse impact 9119, and ROI 9118. In addition, a job analysis technical report 9114 will also be produced from modular content selected based on the unique inputs provided by the user and a technical manual 9116 associated with unique modular assessment components. To assist this stage, data about the selected assessments is stored in the Assessment Battery and Estimated Validity 9117. This is a database that stores information about assessment combinations and how well they predict outcomes of interest (i.e. validity) that can be used to help populate the Assessment Technical Summary 9115 and the Technical Manual 9116.

The Job Analysis Technical Report 9114 is created in the following way. Using information from the job profile 9015 and the Assessment Sign-off 9113, modular content associated with all available competencies, statistical analyses, and other user specifications about the job are used to produce a document describing the job analysis process, results of any JAQ survey administrations, and how job information is associated with selected assessment components.

The Assessment Technical Summary is a short reference document intended to bring together all critical elements of the job analysis and assessment to give users a "snapshot" of the work that has been done in the ASDS system. This would include a summary of key job competencies and importance ratings, assessment components selected to best measure those key job competencies, estimates of criterion-related validity, and return on investment (ROI). An ROI Calculator 9118 is used to calculate this. This is a computational engine that produces an estimated financial benefit associated with the use of the selected assessments. It utilizes data inputs such as validity coefficients of the assessments, user-adjustable inputs on selection rates, compensation data for the same or similar jobs, sample pricing, and various other financial and statistical inputs to arrive at an accurate estimate. Optionally this feature is also linked to the interface of the Assessment Optimisation 9101 to help guide decisions. This report also contains data on possible adverse impacts, calculated from an Adverse Impacts database 9119 This is a database that stores information about the performance of some demographic groups with respect to the assessments chosen when that information is known and available.

The Technical Manual goes into greater detail about the history and development of each individual assessment component included in the final total assessment combination. This would include information like normative data and samples used in development, what the assessment measures and how well, and how it relates to competencies. The Technical Manual Modular Content Repository 9120 is a database that stores modular content associated with the development and technical information for assessment components. It can be used to populate a technical manual based on the assessment components chosen in the assessment sign off 9113.

The end state is a complete assessment solution 9121 ready to administer to others or candidates, along with associated technical documentation to support its use and for future reference. The Assessment Configuration stage delivers the Final Configured Assessment, which is used in the Administration-Results-Data Collection phase. This will be a transition phase to the SHL TMS standard assessment delivery and reporting platform.

The final configured assessment 9121 is configured in an online test publication and delivery platform that presents users with assessments, captures responses, applies scoring algorithms, and reports results. The scoring algorithms would employ the Composite Distribution Estimator element of the Solution Design System to create overall scores from various forms of individual assessments. These overall scores allow users to better compare the scores of test takers. The online test publication and delivery platform has the capability to administer and score diverse assessment item types, utilizing animated simulations, computer adaptive testing, personality tests of various types (including Atlas), biodata, skills tests, and all other available assessment content as depicted in the sample representation in the Assessment Portfolio 9109.

Within the online delivery system, users have the opportunity to create projects 9201 as one-time or recurring, invite others (e.g. candidates 9202) to complete an assessment, and view results 9204, with an accompanying report generated by the Report Building Tool 9200. Users have to option to specify what content they want included in the Report following Administration 9203. The virtual recruiter tool 9205 settings will impact administration 9203 and the test taker user experience. Reporting of results allows for deeper analytics 9207, as well as exporting of results to applicant tracking systems 9208, or real-time online reporting 9209.

Candidates 9202 complete the assessment during the Administration stage 9204 and can be invited to complete an assessment in a variety of methods controlled by the user as configured in the standard SHL TMS assessment delivery and reporting platform. Other options exist, though typically take the form of system generated URLs based on email address input, static URLs and/or session codes that can be copied and sent by users outside of the system, or integration with the user's Applicant Tracking System (ATS), 9208.

Following the Administration 9204 the system computes the results 9205 using the Solution Design System (SDS) and produces standard reports as available in the SHL TMS standard assessment delivery and reporting platform. These results can be shared/used with applications such as Talent Analytics 9207 and an ATS 9208. Results of completed assessments are added to the Talent Analytics database which provides SHL TMS with the ability to provide custom benchmarks based on aggregations of data beyond a single client or job. Results are exported to integrated Applicate Tracking Systems (ATS). Results can also be stored for online reporting 9209 via the standard SHL TMS assessment delivery and reporting platform.

During administration of the assessment a Virtual Recruiter may be used. This is functionality embedded into the SHL TMS assessment delivery and reporting platform that enables users to customize and enhance the experience for candidates taking their assessments (see also 9111). Options here would include additional customizations not implemented during the initial assessment build which are not contingent on the exact solution configuration. Information around realistic job previews, instructions, standard or customized multimedia materials, modifications to the assessment appearance, incorporating branding materials, adjusting colour schemes, and change to entry/exit messages would be applicable.

The system has the capability to automatically request validation data 9206 to further fine-tune the "predictiveness" of available assessments by sending out email requests to supervisors for individuals assessed and hired (to be provided by user/admin user) at specific intervals after hire. The rating request emails contain URL hyperlinks to an online rating form connected with the job originally used as the basis for the assessment. This information would be fed back into the predictor specification data 9104 as one element of a self-perpetuating database. To elaborate, the candidates results are stored in SHL TMS databases, and for those individuals actually hired (as determined by follow-up communication with the user), rating forms based on key job competencies from the job profile and unique job ID created at the time of the original job profiling activity are sent to supervisors of hired and tested individuals. The user would specify email addresses so the system could automate the data collection process. Responses to the Job Performance Rating form (JPR) would be requested at a pre-determined post-hire time interval to allow for sufficient on-the-job experience and ability to demonstrate performance in role. The responses would update the validity for the user and also recalibrate and populate the existing SHL TMS data for the targeted job roles and assessments, i.e. the Predictor Outcome Correlation Data 9103 and the Predictor Specification Data 9104.

It will be understood that the invention has been described above purely by way of example, and modifications of detail can be made within the scope of the invention.

Each feature disclosed in the description, and (where appropriate) the claims and drawings may be provided independently or in any appropriate combination.

Reference numerals appearing in any claims are by way of illustration only and shall have no limiting effect on the scope of the claims.

The invention claimed is:

1. A computer-implemented method of designing an assessment scheme for assessing the suitability of a candidate for a role, the method comprising:
   receiving, as input from a user, (i) at least one candidate requirement including a role identifier, and (ii) at least one test identifier;
   analyzing the identified role into constituent components;
   constructing a plurality of candidate assessment schemes each comprising a plurality or battery of tests in dependence on the test identifier, wherein each of the tests is adapted to determine at least one constituent component of the role;
   accessing a database of prior candidate assessments, including assessments of candidates in roles different from the identified role, in which the assessments have been linked to constituent components of one or more of the roles;
   determining, in dependence upon the prior candidate assessments, an effectiveness of each test for determining the at least one constituent component, in which the effectiveness is determined using the candidate assessments of candidates in roles different from the identified role;
   ranking the candidate assessment schemes in dependence on the determined effectiveness;

displaying to the user a set of ranked candidate assessment schemes, including data concerning the determined effectiveness;

receiving, as input from the user, a selection of one of the assessment schemes;

performing a rules-based analysis of the assessment scheme;

displaying a user interface including interactive elements configured to add or remove a test from the selected assessment scheme;

generating an updated assessment scheme by adding or removing a test from the selected assessment scheme in response to user input received through the user interface;

updating the data concerning the effectiveness of the updated assessment scheme, and providing feedback to the user regarding the analysis of the updated assessment scheme;

displaying to the user a demonstration of the updated assessment scheme;

after displaying the demonstration of the updated assessment scheme, receiving user input indicating approval of the updated assessment scheme; and in response to receiving the user input indicating approval of the assessment scheme, publishing the updated assessment scheme to provide the plurality or battery of tests of the updated assessment scheme for delivery over a communication network.

2. The method according to claim 1, wherein the assessment schemes are for assessing the suitability of a candidate or a plurality of candidates for a job or role.

3. The method according to claim 2, further comprising receiving an analysis of the job or role from an external source.

4. The method according to claim 1, wherein one or more of the assessment schemes comprise a combination of multiple tests or batteries of tests resulting in a composite score or combined score for a particular candidate thereby allowing multiple candidates to be ranked accordingly.

5. The method according to claim 1, wherein the input received from the user comprises one or more of:
the identification or definition of a role or job; or
a required outcome.

6. The method according to claim 5, wherein the required outcome comprises a business outcome that is one or more of: retention, performance, or readiness.

7. The method according to claim 5, wherein the required outcome is a design strategy relates to an aspect of the assessment scheme, such as one or more of: predictive power, validity, fairness, adverse impact, efficiency, or brevity.

8. The method according to claim 1, wherein the components relate to competencies, skills, experience and other requirements.

9. The method according to claim 1, further comprising comparing one or more of the assessment schemes with at least one of:
other schemes already in existence;
previously selected schemes;
industry best-practice;
compliance with standards;
compliance with legislation; or
avoidance of bias and/or prejudice.

10. The method according to claim 1, further comprising proposing alternative assessment schemes or constituent tests.

11. The method according to claim 1, wherein the feedback takes the form of a scorecard.

12. The method according to claim 11, further comprising creating a synthetic score for a composite test, comprising a plurality of tests, by combining scores and/or score distributions from the plurality of tests.

13. The method according to claim 12, the method comprising analyzing a score distribution for each test and classifying each test according to a distribution taxonomy.

14. The method according to claim 13, further comprising calculating one or more of: mean, standard deviation, skewness and kurtosis of the test score distributions.

15. The method according to claim 13, further comprising assigning a weighting to at least one test score distribution and combining the test score distributions in dependence on the weighting.

16. The method according to claim 1, further comprising configuring the assessment scheme for use with candidates by administration on an assessment delivery platform.

17. The method according to claim 1, wherein allowing the user to add a test or remove a test from the selected assessment scheme comprises providing user interface data for display of a user interface comprising one or more interactive elements that, when interacted with by a user, add or remove a test from the selected assessment scheme; and
wherein allowing the user to approve the assessment scheme comprises providing user interface data for display of a user interface comprising one or more interactive elements that, when interacted with by a user, approve the assessment scheme for presentation to one or more individuals.

18. The method according to claim 1, comprising providing, by one or more computers, a series of guided interactions in a user interface that include:
displaying, by the one or more computers, a visualization of the data indicating the determined effectiveness of the candidate assessment schemes;
providing, by the one or more computers, user interface elements that guide a process of selecting and customizing an assessment scheme; and
presenting, by the one or more computers, an updated visualization of the effectiveness data based on the rules-based analysis of the customized assessment scheme.

19. The method according to claim 1, wherein determining the effectiveness of each test comprises determining, for each of multiple tests in an assessment scheme, the effectiveness of the test by establishing a quantitative index of an ability of the test to accurately predict a corresponding component of a role, the quantitative index being generated using data regarding other roles which require the performance of the same component.

20. A system for designing an assessment scheme for assessing the suitability of a candidate for a role, the system comprising:
one or more computers; and
one or more computer-readable media storing instructions that are operable, when executed by the one or more computers, to cause the one or more computers to perform operations comprising:
receiving, as input from a user, (i) at least one candidate requirement including a role identifier, and (ii) at least one test identifier;
analyzing the identified role into constituent components;
constructing a plurality of candidate assessment schemes each comprising a plurality or battery of tests in dependence on the test identifier, wherein each of the tests is adapted to determine at least one constituent component of the role;

accessing a database of prior candidate assessments, including assessments of candidates in roles different from the identified role, in which the assessments have been linked to constituent components of one or more of the roles;

determining, in dependence upon the prior candidate assessments, an effectiveness of each test for determining the at least one constituent component, in which the effectiveness is determined using the candidate assessments of candidates in roles different from the identified role;

ranking the candidate assessment schemes in dependence on the determined effectiveness;

displaying to the user a set of ranked candidate assessment schemes, including data concerning the determined effectiveness;

receiving, as input from the user, a selection of one of the assessment schemes;

performing a rules-based analysis of the assessment scheme;

displaying a user interface including interactive elements configured to add or remove a test from the selected assessment scheme;

generating an updated assessment scheme by adding or removing a test from the selected assessment scheme in response to user input received through the user interface;

updating the data concerning the effectiveness of the updated assessment scheme, and providing feedback to the user regarding the analysis of the updated assessment scheme;

displaying to the user a demonstration of the updated assessment scheme;

after displaying the demonstration of the updated assessment scheme, receiving user input indicating approval of the updated assessment scheme; and in response to receiving the user input indicating approval of the assessment scheme, publishing the updated assessment scheme to provide the plurality or battery of tests of the updated assessment scheme for delivery over a communication network.

\* \* \* \* \*